(12) United States Patent
Tang et al.

(10) Patent No.: US 8,355,213 B2
(45) Date of Patent: Jan. 15, 2013

(54) PHOTOGRAPHING LENS SYSTEM

(75) Inventors: Hsiang Chi Tang, Taichung (TW); Tsung Han Tsai, Taichung (TW)

(73) Assignee: Largen Precision Co., Ltd., Taichung (TW)

( * ) Notice: Subject to any disclaimer, the term of this patent is extended or adjusted under 35 U.S.C. 154(b) by 457 days.

(21) Appl. No.: 12/659,501

(22) Filed: Mar. 11, 2010

(65) Prior Publication Data
US 2011/0090392 A1 Apr. 21, 2011

(30) Foreign Application Priority Data
Oct. 19, 2009 (TW) ................. 98135291 A

(51) Int. Cl.
*G02B 3/02* (2006.01)
*G02B 13/18* (2006.01)
*G02B 9/12* (2006.01)
(52) U.S. Cl. ........................ 359/716; 359/784
(58) Field of Classification Search .......... 359/716, 359/753, 784, 785
See application file for complete search history.

(56) References Cited

U.S. PATENT DOCUMENTS
6,490,102 B1   12/2002   Huang
7,679,841 B2 *  3/2010   Chen et al. ............ 359/716

FOREIGN PATENT DOCUMENTS
CN          101414046 A      4/2009

* cited by examiner

Primary Examiner — William Choi
(74) Attorney, Agent, or Firm — Bacon & Thomas, PLLC

(57) ABSTRACT

This invention provides a photographing lens system comprising, in order from an object side to an image side: a first lens with positive refractive power having a convex object-side surface; a second lens with negative refractive power, both its two surfaces being aspheric; a third lens having a concave image-side surface, both its two surfaces being aspheric and at least one of them having at least one inflection point; and an aperture stop disposed between an imaged object and the first lens; wherein there are only three lenses with refractive power; the focal length of the photographing lens system is f, the focal length of the first lens and the second lens is f1 and f2, respectively, the radius of curvature of the object-side surface of the first lens is R1, the Abbe number of the first lens and second lens is V1 and V2, respectively, and they satisfy the relations: $1.28<f/f1<2.0$, $23.0<(R1/f)*100<33.0$, $30.5<V1-V2<46.0$, $-0.65<f/f2<-0.25$.

20 Claims, 33 Drawing Sheets

| TABLE 1 | | | | | | | |
|---|---|---|---|---|---|---|---|
| (Embodiment 1) | | | | | | | |
| f = 2.70 mm, Fno = 2.80, HFOV = 32.7 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.180 | | | | |
| 2 | Lens 1 | 0.76025 (ASP) | 0.338 | Plastic | 1.544 | 55.9 | 1.94 |
| 3 | | 2.27623 (ASP) | 0.427 | | | | |
| 4 | Lens 2 | -0.71274 (ASP) | 0.280 | Plastic | 1.632 | 23.4 | -6.42 |
| 5 | | -0.99614 (ASP) | 0.406 | | | | |
| 6 | Lens 3 | 2.58173 (ASP) | 0.505 | Plastic | 1.530 | 55.8 | -17.26 |
| 7 | | 1.87712 (ASP) | 0.300 | | | | |
| 8 | IR-filter | Plano | 0.330 | Glass | 1.517 | 64.2 | - |
| 9 | | Plano | 0.364 | | | | |
| 10 | Image | Plano | | | | | |
| 註: Clear aperture diameter on surface #7 is 2.76mm | | | | | | | |

Fig.17

| TABLE 2A | | | | |
|---|---|---|---|---|
| Aspheric Coefficients | | | | |
| Surface # | 2 | 3 | 4 | 5 |
| k = | -3.32506E-01 | -4.31056E-01 | 1.07251E+00 | -4.46027E+00 |
| A4 = | 1.72034E-01 | 2.30649E-02 | 4.80508E-01 | -4.28238E-01 |
| A6 = | 1.43641E-01 | 2.06130E+00 | -7.69222E-02 | 1.67753E+00 |
| A8 = | 1.18610E+00 | -2.28360E+01 | 1.81834E+01 | -3.50375E-01 |
| A10= | 9.97276E-01 | 1.11064E+02 | -8.35648E+01 | 1.47035E+00 |
| A12= | 6.63699E+00 | -1.06548E+02 | 3.95602E+02 | -3.33899E+00 |
| A14= | -4.59864E+01 | -8.68056E+02 | -1.25585E+03 | -1.58348E+00 |
| A16= | 3.53230E+01 | 1.73542E+03 | 2.21873E+03 | 4.42355E+00 |

Fig.18A

| TABLE 2B | | |
|---|---|---|
| Aspheric Coefficients | | |
| Surface # | 6 | 7 |
| k = | -1.53251E+01 | -1.68019E+01 |
| A1 = | | |
| A2 = | | |
| A3 = | | |
| A4 = | -3.68816E-01 | -1.67260E-01 |
| A5 = | | |
| A6 = | 5.16611E-01 | 5.00371E-02 |
| A7 = | | |
| A8 = | -5.25684E-01 | -1.94594E-02 |
| A9 = | | |
| A10= | 3.86167E-01 | 1.02090E-02 |
| A11= | | |
| A12= | -1.70363E-01 | -1.07884E-02 |
| A13= | | |
| A14= | 3.80536E-02 | 4.61160E-03 |
| A15= | | |
| A16= | -2.90686E-03 | -5.05835E-04 |

Fig.18B

| TABLE 3 | | | | | | |
|---|---|---|---|---|---|---|
| (Embodiment 2) | | | | | | |
| f = 3.53 mm, Fno = 2.78, HFOV = 32.6 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.231 | | | | |
| 2 | Lens 1 | 1.00239 (ASP) | 0.566 | Plastic | 1.544 | 55.9 | 2.45 |
| 3 | | 3.21720 (ASP) | 0.316 | | | | |
| 4 | Lens 2 | -0.90487 (ASP) | 0.187 | Plastic | 1.632 | 23.4 | -8.70 |
| 5 | | -1.16967 (ASP) | 0.515 | | | | |
| 6 | Lens 3 | -76.92310 (ASP) | 1.160 | Plastic | 1.544 | 55.9 | -13.82 |
| 7 | | 8.37880 (ASP) | 0.300 | | | | |
| 8 | IR-filter | Plano | 0.300 | Glass | 1.517 | 64.2 | - |
| 9 | | Plano | 0.547 | | | | |
| 10 | Image | Plano | | | | | |

Fig.19

| TABLE 4A | | | | |
|---|---|---|---|---|
| Aspheric Coefficients | | | | |
| Surface # | 2 | 3 | 4 | 5 |
| k = | -3.30274E+00 | 0.00000E+00 | -1.26252E+00 | -1.82861E+00 |
| A4 = | 4.16971E-01 | -2.49115E-02 | -3.34590E-01 | -8.09057E-02 |
| A6 = | -6.04925E-02 | -5.07688E-01 | 1.17109E+00 | 5.90445E-01 |
| A8 = | -6.43020E-01 | 1.18044E+00 | -3.52589E+00 | 1.68239E+00 |
| A10= | 2.69085E+00 | -3.90571E+00 | 1.34477E+01 | -2.00295E+00 |
| A12= | -3.14955E+00 | | -2.35899E+01 | 2.27131E+00 |

Fig.20A

| TABLE 4B | | |
|---|---|---|
| Aspheric Coefficients | | |
| Surface # | 6 | 7 |
| k = | -1.00000E+04 | -8.18349E+00 |
| A1 = | | |
| A2 = | | |
| A3 = | | |
| A4 = | -2.01114E-01 | -8.18193E-02 |
| A5 = | | |
| A6 = | 1.13840E-01 | 7.37648E-03 |
| A7 = | | |
| A8 = | -9.38303E-02 | -3.00653E-03 |
| A9 = | | |
| A10= | -2.79015E-02 | -2.32803E-04 |
| A11= | | |
| A12= | 5.36603E-02 | 2.79324E-05 |

Fig.20B

| TABLE 5 | | | | | | |
|---|---|---|---|---|---|---|
| (Embodiment 3) | | | | | | |
| f = 3.23 mm, Fno = 2.88, HFOV = 34.9 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.152 | | | | |
| 2 | Lens 1 | 1.07339 (ASP) | 0.521 | Plastic | 1.544 | 55.9 | 2.43 |
| 3 | | 4.70830 (ASP) | 0.418 | | | | |
| 4 | Lens 2 | -0.85216 (ASP) | 0.246 | Plastic | 1.632 | 23.4 | -6.86 |
| 5 | | -1.17922 (ASP) | 0.476 | | | | |
| 6 | Lens 3 | 3.16190 (ASP) | 0.986 | Plastic | 1.544 | 55.9 | -63.88 |
| 7 | | 2.57978 (ASP) | 0.200 | | | | |
| 8 | IR-filter | Plano | 0.200 | Glass | 1.517 | 64.2 | - |
| 9 | | Plano | 0.200 | | | | |
| 10 | Cover-glass | Plano | 0.400 | Glass | 1.517 | 64.2 | - |
| 11 | | Plano | 0.162 | | | | |
| 12 | Image | Plano | | | | | |

Fig.21

| TABLE 6 | | | | | | |
|---|---|---|---|---|---|---|
| Aspheric Coefficients | | | | | | |
| Surface # | 2 | 3 | 4 | 5 | 6 | 7 |
| k = | -3.13329E+00 | 0.00000E+00 | -8.87382E-01 | -9.54196E-01 | -2.14875E+01 | -1.41720E+00 |
| A4 = | 3.19463E-01 | -8.95594E-02 | -3.73953E-01 | -1.08719E-01 | -1.52041E-01 | -1.29112E-01 |
| A6 = | -1.88379E-01 | -4.33512E-01 | 1.16032E+00 | 2.93307E-01 | 1.10543E-01 | 4.30776E-02 |
| A8 = | -1.78581E-01 | 8.66585E-01 | -4.98280E+00 | 1.87583E+00 | -4.80539E-02 | -1.35023E-02 |
| A10= | 2.19680E+00 | -3.56938E+00 | 1.94893E+01 | -2.36084E+00 | 1.00331E-02 | 2.17253E-03 |
| A12= | -4.93089E+00 | | -3.40083E+01 | 8.89797E-01 | -5.17794E-04 | -1.82794E-04 |

Fig.22

| TABLE 7 | | | | | | |
|---|---|---|---|---|---|---|
| (Embodiment 4) | | | | | | |
| f = 3.14 mm, Fno = 2.78, HFOV = 35.3 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.150 | | | | |
| 2 | Lens 1 | 1.05251 (ASP) | 0.520 | Plastic | 1.544 | 55.9 | 2.27 |
| 3 | | 5.86130 (ASP) | 0.392 | | | | |
| 4 | Lens 2 | -0.84877 (ASP) | 0.266 | Plastic | 1.632 | 23.4 | -5.21 |
| 5 | | -1.28274 (ASP) | 0.385 | | | | |
| 6 | Lens 3 | 3.34540 (ASP) | 1.176 | Plastic | 1.544 | 55.9 | 104.45 |
| 7 | | 3.11430 (ASP) | 0.300 | | | | |
| 8 | IR-filter | Plano | 0.300 | Glass | 1.517 | 64.2 | - |
| 9 | | Plano | 0.365 | | | | |
| 10 | Image | Plano | | | | | |

Fig.23

| TABLE 8A | | | | |
|---|---|---|---|---|
| Aspheric Coefficients | | | | |
| Surface # | 2 | 3 | 4 | 5 |
| k = | -3.03738E+00 | 0.00000E+00 | -7.22311E-01 | -5.07508E-01 |
| A4 = | 3.20420E-01 | -1.35533E-01 | -4.23595E-01 | -1.67104E-01 |
| A6 = | -2.09910E-01 | -4.69259E-01 | 1.17139E+00 | 5.04177E-01 |
| A8 = | -2.17123E-01 | 5.15510E-01 | -3.99100E+00 | 1.69660E+00 |
| A10= | 2.50536E+00 | -3.26248E+00 | 1.36996E+01 | -2.28375E+00 |
| A12= | -6.29097E+00 | | -2.51917E+01 | 1.05068E+00 |

Fig.24A

| TABLE 8B | | |
|---|---|---|
| Aspheric Coefficients | | |
| Surface # | 6 | 7 |
| k = | -5.17680E+01 | -7.15592E-01 |
| A1 = | | |
| A2 = | | |
| A3 = | | |
| A4 = | -1.53788E-01 | -1.20747E-01 |
| A5 = | | |
| A6 = | 1.12146E-01 | 3.66531E-02 |
| A7 = | | |
| A8 = | -5.29292E-02 | -1.30491E-02 |
| A9 = | | |
| A10= | 9.49564E-03 | 2.29188E-03 |
| A11= | | |
| A12= | 1.03389E-03 | -2.17398E-04 |

Fig.24B

| TABLE 9 | | | | | | | |
|---|---|---|---|---|---|---|---|
| (Embodiment 5) | | | | | | | |
| f = 2.57 mm, Fno = 2.85, HFOV = 33.0 deg. | | | | | | | |
| Surface # | | Curvature Radius | Thickness | Material | Index | Abbe # | Focal length |
| 0 | Object | Plano | Infinity | | | | |
| 1 | Lens 1 | 0.71197 (ASP) | 0.473 | Plastic | 1.544 | 55.9 | 1.84 |
| 2 | | 1.88787 (ASP) | 0.063 | | | | |
| 3 | Ape. Stop | Plano | 0.295 | | | | |
| 4 | Lens 2 | -0.59714 (ASP) | 0.367 | Plastic | 1.632 | 23.4 | -3.26 |
| 5 | | -1.04143 (ASP) | 0.207 | | | | |
| 6 | Lens 3 | 1.82447 (ASP) | 0.599 | Plastic | 1.530 | 55.8 | 6.88 |
| 7 | | 3.23790 (ASP) | 0.200 | | | | |
| 8 | IR-filter | Plano | 0.300 | Glass | 1.517 | 64.2 | - |
| 9 | | Plano | 0.100 | | | | |
| 10 | Cover-glass | Plano | 0.400 | Glass | 1.517 | 64.2 | - |
| 11 | | Plano | 0.131 | | | | |
| 12 | Image | Plano | | | | | |

Fig.25

| TABLE 10 | | | | | | |
|---|---|---|---|---|---|---|
| Aspheric Coefficients | | | | | | |
| Surface # | 1 | 2 | 4 | 5 | 6 | 7 |
| k = | -4.22124E-01 | -1.44471E+01 | -6.68041E-01 | 6.09602E-01 | -1.71635E+01 | -2.05541E+01 |
| A4 = | 2.23944E-01 | 3.84485E-01 | -6.38070E-01 | -1.96919E-01 | -2.33051E-01 | -1.80343E-01 |
| A6 = | 2.88508E-01 | -1.11579E+00 | -4.88414E+00 | 6.03351E-01 | 3.08399E-01 | 3.50453E-02 |
| A8 = | 9.92860E-02 | 2.44742E+00 | 1.61863E+01 | 1.96140E+00 | -1.88854E-01 | -1.94668E-02 |
| A10= | 6.17106E+00 | -5.70082E+01 | -6.79391E+01 | -1.70929E+00 | 6.50828E-02 | 2.01535E-02 |
| A12= | -1.27913E+01 | 2.17526E+02 | 2.98762E+02 | 2.27960E-01 | -1.22470E-02 | -7.21711E-03 |
| A14= | | | -5.29805E+03 | | 1.03502E-03 | 8.58724E-04 |

Fig.26

| TABLE 11 | | | | | | | |
|---|---|---|---|---|---|---|---|
| (Embodiment 6) | | | | | | | |
| f = 3.57 mm, Fno = 2.78, HFOV = 32.6 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.231 | | | | |
| 2 | Lens 1 | 1.00162 (ASP) | 0.527 | Plastic | 1.544 | 55.9 | 2.54 |
| 3 | | 2.97653 (ASP) | 0.360 | | | | |
| 4 | Lens 2 | -0.87423 (ASP) | 0.190 | Plastic | 1.632 | 23.4 | -7.98 |
| 5 | | -1.14655 (ASP) | 0.524 | | | | |
| 6 | Lens 3 | 12.41910 (ASP) | 1.114 | Plastic | 1.544 | 55.9 | -27.10 |
| 7 | | 6.52820 (ASP) | 0.300 | | | | |
| 8 | IR-filter | Plano | 0.300 | Glass | 1.517 | 64.2 | - |
| 9 | | Plano | 0.617 | | | | |
| 10 | Image | Plano | | | | | |

Fig.27

| TABLE 12A | | | | |
|---|---|---|---|---|
| Aspheric Coefficients | | | | |
| Surface # | 2 | 3 | 4 | 5 |
| k = | -2.89961E+00 | 0.00000E+00 | -9.07940E-01 | -9.74191E-01 |
| A4 = | 3.85290E-01 | -3.14334E-02 | -3.95141E-01 | -1.31787E-01 |
| A6 = | -7.21902E-02 | -3.72854E-01 | 1.19851E+00 | 5.76730E-01 |
| A8 = | -4.42056E-01 | 8.31784E-01 | -3.62232E+00 | 1.66863E+00 |
| A10= | 2.49277E+00 | -3.58011E+00 | 1.40589E+01 | -2.06441E+00 |
| A12= | -3.41467E+00 | | -2.37626E+01 | 2.53637E+00 |

Fig.28A

| TABLE 12B | | |
|---|---|---|
| Aspheric Coefficients | | |
| Surface # | 6 | 7 |
| k = | -1.09941E+03 | 2.02126E+00 |
| A1 = | | |
| A2 = | | |
| A3 = | | |
| A4 = | -1.73502E-01 | -1.08064E-01 |
| A5 = | | |
| A6 = | 7.92363E-02 | 2.56819E-02 |
| A7 = | | |
| A8 = | -7.34585E-02 | -1.18118E-02 |
| A9 = | | |
| A10= | 1.08012E-02 | 2.09919E-03 |
| A11= | | |
| A12= | 1.79311E-02 | -1.99159E-04 |

Fig.28B

| TABLE 13 | | | | | | |
|---|---|---|---|---|---|---|
| (Embodiment 7) | | | | | | |
| f = 3.05 mm, Fno = 2.85, HFOV = 30.0 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.190 | | | | |
| 2 | Lens 1 | 0.86759 (ASP) | 0.397 | Plastic | 1.544 | 55.9 | 2.27 |
| 3 | | 2.45286 (ASP) | 0.289 | | | | |
| 4 | Lens 2 | -0.83496 (ASP) | 0.250 | Plastic | 1.632 | 23.4 | -4.77 |
| 5 | | -1.28913 (ASP) | 0.359 | | | | |
| 6 | Lens 3 | 2.14508 (ASP) | 0.430 | Plastic | 1.544 | 55.9 | 11.34 |
| 7 | | 3.05640 (ASP) | 0.500 | | | | |
| 8 | IR-filter | Plano | 0.300 | Glass | 1.517 | 64.2 | - |
| 9 | | Plano | 0.869 | | | | |
| 10 | Image | Plano | | | | | |

Fig.29

| TABLE 14A | | | | |
|---|---|---|---|---|
| Aspheric Coefficients | | | | |
| Surface # | 2 | 3 | 4 | 5 |
| k = | -1.38347E-01 | -7.13298E+00 | 1.10225E+00 | -8.91481E+00 |
| A4 = | 8.07035E-02 | 3.56606E-02 | 2.08568E-01 | -5.94298E-01 |
| A6 = | 2.21354E-01 | -2.12192E-02 | 1.87774E+00 | 2.45706E+00 |
| A8 = | -7.30529E-01 | -6.67424E-01 | 5.28761E-01 | -1.75319E+00 |
| A10= | 4.74236E+00 | -6.81470E+00 | 1.09069E+01 | 5.57416E+00 |
| A12= | -3.79120E+00 | 6.67634E+01 | -2.09058E+01 | -5.41267E+00 |
| A14= | -1.95990E+01 | -1.65061E+02 | -7.58323E-01 | 9.87310E-03 |
| A16= | 4.48434E+01 | 2.22516E-01 | 7.14134E-01 | 9.58481E+00 |

Fig.30A

| TABLE 14B | | |
|---|---|---|
| Aspheric Coefficients | | |
| Surface # | 6 | 7 |
| k = | -2.31825E+01 | -6.64319E+00 |
| A1 = | | |
| A2 = | | |
| A3 = | | |
| A4 = | -3.35247E-01 | -3.23349E-01 |
| A5 = | | |
| A6 = | 1.43607E-01 | 1.52456E-01 |
| A7 = | | |
| A8 = | -1.27128E-01 | -9.97214E-02 |
| A9 = | | |
| A10= | 2.24722E-02 | -1.35965E-02 |
| A11= | | |
| A12= | 2.86157E-02 | 4.89424E-02 |
| A13= | | |
| A14= | 3.54424E-02 | -2.65132E-02 |

Fig.30B

| TABLE 15 | | | | | | |
|---|---|---|---|---|---|---|
| (Embodiment 8) | | | | | | |
| f = 2.90 mm, Fno = 2.45, HFOV = 32.4deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.093 | | | | |
| 2 | Lens 1 | 1.26117 (ASP) | 0.552 | Plastic | 1.544 | 55.9 | 1.98 |
| 3 | | -6.43100 (ASP) | 0.253 | | | | |
| 4 | Lens 2 | -0.99515 (ASP) | 0.250 | Plastic | 1.632 | 23.4 | -4.87 |
| 5 | | -1.60573 (ASP) | 0.497 | | | | |
| 6 | Lens 3 | 2.93237 (ASP) | 0.996 | Plastic | 1.530 | 55.8 | -17.16 |
| 7 | | 1.95817 (ASP) | 0.300 | | | | |
| 8 | IR-filter | Plano | 0.400 | Glass | 1.517 | 64.2 | - |
| 9 | | Plano | 0.247 | | | | |
| 10 | Image | Plano | | | | | |

Fig.31

| TABLE 16 | | | | | | |
|---|---|---|---|---|---|---|
| Aspheric Coefficients | | | | | | |
| Surface # | 2 | 3 | 4 | 5 | 6 | 7 |
| k = | -7.83177E-01 | -1.00000E+00 | -4.02949E-01 | -9.06401E-01 | -4.72452E+01 | -7.34837E+00 |
| A4 = | -5.86864E-02 | -3.50454E-01 | -5.54971E-01 | -2.62349E-01 | -2.17200E-01 | -1.20717E-01 |
| A6 = | 1.49407E-01 | -5.65260E-01 | 2.76956E+00 | 1.52416E+00 | 2.93263E-02 | 5.47389E-02 |
| A8 = | -1.07821E+00 | 2.20004E-01 | -5.53751E+00 | -4.42277E-01 | 1.12095E-02 | -2.80300E-02 |
| A10= | -5.61898E-01 | 4.33064E-01 | 1.10459E+01 | 1.02460E-01 | -7.26943E-03 | 6.63406E-03 |
| A12= | 1.27940E-04 | -3.82904E-04 | -8.54142E+00 | -2.09406E-04 | -5.84232E-02 | -9.03637E-04 |

Fig.32

TABLE 17

| | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| f | 2.70 | 3.53 | 3.23 | 3.14 | 2.57 | 3.57 | 3.05 | 2.90 |
| Fno | 2.80 | 2.78 | 2.88 | 2.78 | 2.85 | 2.78 | 2.85 | 2.45 |
| HFOV | 32.7 | 32.6 | 34.9 | 35.3 | 33.0 | 32.6 | 30.0 | 32.4 |
| V1−V2 | 32.5 | 32.5 | 32.5 | 32.5 | 32.5 | 32.5 | 32.5 | 32.5 |
| CT2 [mm] | 0.280 | 0.187 | 0.246 | 0.266 | 0.367 | 0.190 | 0.250 | 0.250 |
| (CT2/f)*100 | 10.4 | 5.3 | 7.6 | 8.5 | 14.3 | 5.3 | 8.2 | 8.6 |
| (R1/f)*100 | 28.2 | 28.4 | 33.2 | 33.5 | 27.7 | 28.1 | 28.4 | 43.5 |
| (T23/f)*100 | 15.0 | 14.6 | 14.7 | 12.3 | 8.1 | 14.7 | 11.8 | 17.1 |
| R5/R6 | 1.38 | −9.18 | 1.23 | 1.07 | 0.56 | 1.90 | 0.70 | 1.50 |
| f/f1 | 1.39 | 1.44 | 1.33 | 1.38 | 1.40 | 1.41 | 1.34 | 1.46 |
| f/f2 | −0.42 | −0.41 | −0.47 | −0.60 | −0.79 | −0.45 | −0.64 | −0.60 |
| |f/f3| | 0.16 | 0.26 | 0.05 | 0.03 | 0.37 | 0.13 | 0.27 | 0.17 |
| TTL/ImgH | 1.62 | 1.69 | 1.61 | 1.61 | 1.77 | 1.71 | 1.88 | 1.82 |

Fig.33

PHOTOGRAPHING LENS SYSTEM

BACKGROUND OF THE INVENTION

1. Field of the Invention

The present invention relates to a photographing lens system, and more particularly, to a compact photographing lens system used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS (Complementary Metal-Oxide Semiconductor Sensor). Furthermore, as advanced semiconductor manufacturing technology has allowed the pixel size of sensors to be reduced and electronic devices have become more compact and powerful, there is an increasing demand for compact imaging lenses featuring better image quality.

A conventional compact imaging lens generally comprises two lens elements so as to reduce the production cost. As the two-element lens has limited capability to correct aberrations, it became insufficient for a high-end photographing module. However, employing excess number of lens elements will make it difficult to reduce the total track length of the lens.

To obtain good image quality and maintain a compact form, a photographing lens system comprising three lens elements is a feasible solution. U.S. Pat. No. 6,490,102 discloses a triplet lens system wherein the third lens is a spherical glass lens. The employment of spherical lens reduces the system's freedom in correcting the off-axis aberrations, making it more difficult to control the image quality.

Therefore, a need exists in the art for a photographing lens system that features better image quality, maintains a moderate total track length and is applicable to compact portable electronic products.

SUMMARY OF THE INVENTION

The present invention provides a photographing lens system comprising, in order from an object side to an image side: a first lens element with positive refractive power having a convex object-side surface; a second lens element with negative refractive power, the object-side and image-side surfaces thereof being aspheric; a third lens element having a concave image-side surface, the object-side and image-side surfaces thereof being aspheric and at least one of which being provided with at least one inflection point; and an aperture stop disposed between an imaged object and the first lens element; wherein there are three lens elements with refractive power; and wherein the focal length of the photographing lens system is f, the focal length of the first lens element is f1, the focal length of the second lens element is f2, the radius of curvature of the object-side surface of the first lens element is R1, the Abbe number of the first lens element is V1, the Abbe number of the second lens element is V2, and they satisfy the relations: $1.28 < f/f1 < 2.0$, $23.0 < (R1/f)*100 < 33.0$, $30.5 < V1-V2 < 46.0$, $-0.65 < f/f2 < -0.25$.

Such an arrangement of optical elements can effectively correct aberrations to improve image quality, and can reduce the total track length to keep the photographing lens system compact.

In the present photographing lens system, the first lens element has positive refractive power and a convex object-side surface so that the total track length of the photographing lens system can be effectively reduced; the second lens element has negative refractive power so that the chromatic aberration of the system can be favorably corrected; the third lens element may have either positive or negative refractive power and serve as a correction lens to balance and correct various kinds of aberration of the system. When the third lens element has positive refractive power, the proportion of positive refractive power contributed by the first lens element can be effectively reduced to mitigate the sensitivity of the system. When the third lens element has negative refractive power, the principal point of the optical system can be positioned far away from the image plane, thereby the total track length of the system can be favorably reduced to keep the photographing lens system compact.

In the present photographing lens system, the first lens element may be a bi-convex lens element having a convex object-side surface and a convex image-side surface, or a meniscus lens element having a convex object-side surface and a concave image-side surface. When the first lens element is a bi-convex lens element, the refractive power thereof can be effectively enhanced to further reduce the total track length of the photographing lens system. When the first lens element is a meniscus lens element, the astigmatism of the system can be corrected more favorably. The second lens element has a concave object-side surface and a convex image-side surface so that the astigmatism of the system can be favorably corrected. The third lens element may be a meniscus lens element having a convex object-side surface and a concave image-side surface, or a bi-concave lens element having a concave object-side surface and a concave image-side surface. When the third lens element is a meniscus lens element, it facilitates the correction of the astigmatism and high order aberrations of the system. When the third lens element is a bi-concave lens element, the principal point of the optical system can be positioned even farther away from the image plane, thereby favorably reducing the total track length of the system to keep the photographing lens system compact.

In the present photographing lens system, the first lens element provides positive refractive power, and the aperture stop is disposed near the object side of the photographing lens system, thereby the total track length of the photographing lens system can be effectively reduced. The aforementioned arrangement also enables the exit pupil of the photographing lens system to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the third lens element is provided with at least one inflection point, thereby the angle at which the light is projected onto the sensor from the off-axis field can be effectively reduced to further correct the off-axis aberrations. In addition, when the aperture stop is disposed near the second lens element, a wide field of view can be favorably achieved. Such an aperture stop placement facilitates the correction of the distortion and chromatic aberration of magnification; thereby the sensitivity of the photographing lens system can be effectively reduced. In other words, when the aperture stop is disposed near the imaged object, the telecentric feature is emphasized and this enables a shorter total track length. When the aperture stop is disposed near the second lens element, the emphasis is on the wide field of view so that the sensitivity of the photographing lens system can be effectively reduced.

The present invention provides another photographing lens system comprising, in order from the object side to the image side: a first lens element with positive refractive power having a convex object-side surface; a second lens element with negative refractive power having a concave object-side surface and a convex image-side surface, the object-side and image-side surfaces thereof being aspheric; a third lens element having a concave image-side surface, the object-side and image-side surfaces thereof being aspheric and at least one of which being provided with at least one inflection point; and an aperture stop disposed between an imaged object and the second lens element; wherein there are three lens elements with refractive power; and wherein the radius of curvature of the object-side surface of the first lens element is R1, the focal length of the photographing lens system is f, the Abbe number of the first lens element is V1, the Abbe number of the second lens element is V2, the on-axis thickness of the second lens element is CT2, the on-axis spacing between the second and third lens elements is T23, and they satisfy the relations: $23.0<(R1/f)*100<33.0$, $30.5<V1-V2<46.0$, $2.0<(CT2/f)*100<12.0$, $0.10[mm]<CT2<0.38[mm]$, $10.0<(T23/f)*100<22.0$.

The present invention provides yet another photographing lens system comprising, in order from the object side to the image side: a first lens element with positive refractive power having a convex object-side surface and a convex image-side surface; a second lens element with negative refractive power, the object-side and image-side surfaces thereof being aspheric; a third lens element having a convex object-side surface and a concave image-side surface, the object-side and image-side surfaces thereof being aspheric and at least one of which being provided with at least one inflection point; and an aperture stop disposed between an imaged object and the second lens element; wherein there are three lens elements with refractive power; and wherein the focal length of the photographing lens system is f, the focal length of the first lens element is f1, the Abbe number of the first lens element is V1, the Abbe number of the second lens element is V2, the on-axis thickness of the second lens element is CT2, and they satisfy the relations: $1.28<f/f1<2.0$, $30.5<V1-V2<46.0$, $2.0<(CT2/f)*100<12.0$, $0.10[mm]<CT2<0.38[mm]$.

BRIEF DESCRIPTION OF THE DRAWINGS

FIG. 17 is TABLE 1 which lists the optical data of the first embodiment.

FIGS. 18A and 18B are TABLES 2A and 2B which list the aspheric surface data of the first embodiment.

FIG. 19 is TABLE 3 which lists the optical data of the second embodiment.

FIGS. 20A and 20B are TABLES 4A and 4B which list the aspheric surface data of the second embodiment.

FIG. 21 is TABLE 5 which lists the optical data of the third embodiment.

FIG. 22 is TABLE 6 which lists the aspheric surface data of the third embodiment.

FIG. 23 is TABLE 7 which lists the optical data of the fourth embodiment.

FIGS. 24A and 24B are TABLES 8A and 8B which list the aspheric surface data of the fourth embodiment.

FIG. 25 is TABLE 9 which lists the optical data of the fifth embodiment.

FIG. 26 is TABLE 10 which lists the aspheric surface data of the fifth embodiment.

FIG. 27 is TABLE 11 which lists the optical data of the sixth embodiment.

FIGS. 28A and 28B are TABLES 12A and 12B which list the aspheric surface data of the sixth embodiment.

FIG. 29 is TABLE 13 which lists the optical data of the seventh embodiment.

FIGS. 30A and 30B are TABLES 14A and 14B which list the aspheric surface data of the seventh embodiment.

FIG. 31 is TABLE 15 which lists the optical data of the eighth embodiment.

FIG. 32 is TABLE 16 which lists the aspheric surface data of the eighth embodiment.

FIG. 33 is TABLE 17 which lists the data of the respective embodiments resulting from the equations.

DETAILED DESCRIPTION OF THE PREFERRED EMBODIMENTS

Figure 1:
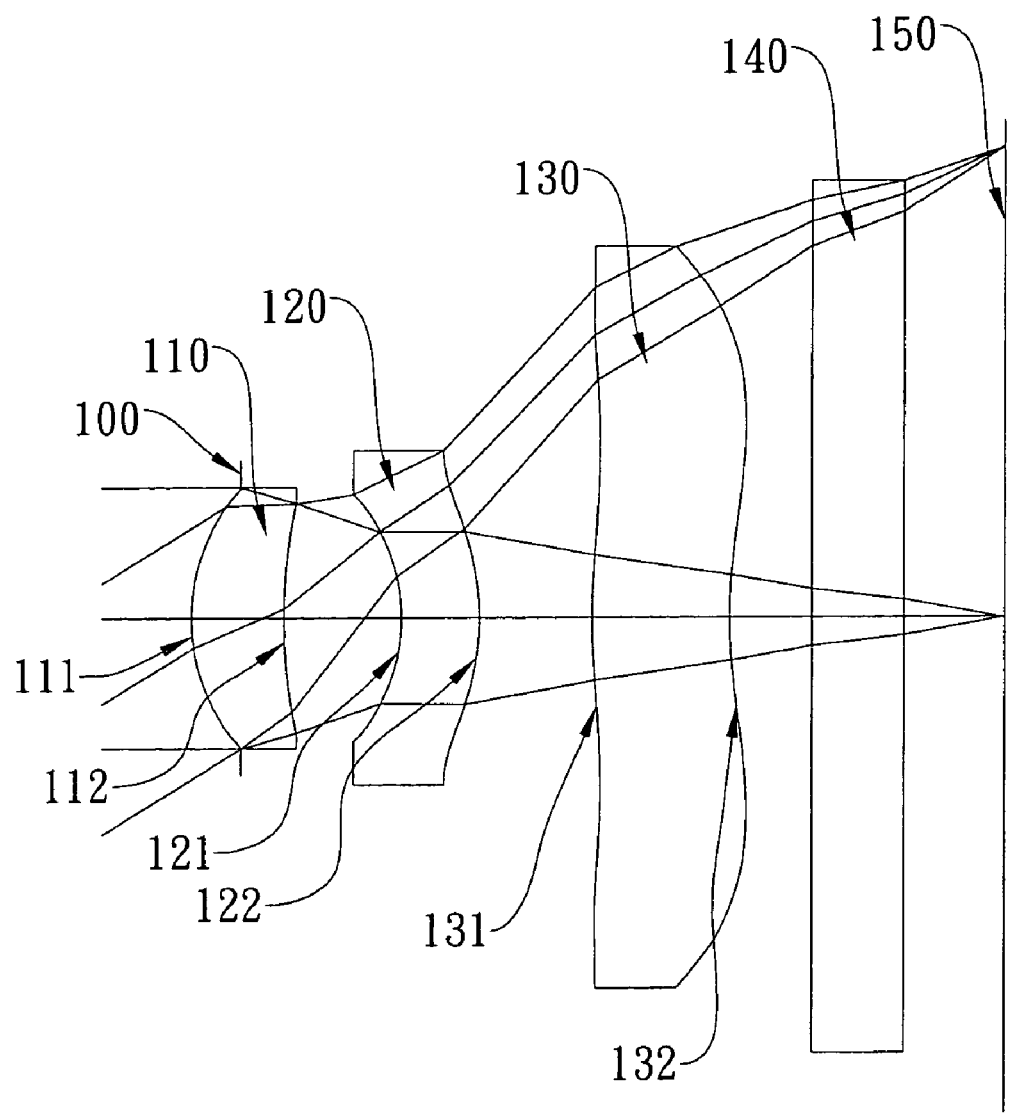
FIG. 1 shows a photographing lens system in accordance with a first embodiment of the present invention.

The present invention provides a photographing lens system comprising, in order from an object side to an image side: a first lens element with positive refractive power having a convex object-side surface; a second lens element with negative refractive power, the object-side and image-side surfaces thereof being aspheric; a third lens element having a concave image-side surface, the object-side and image-side surfaces thereof being aspheric and at least one of which being provided with at least one inflection point; and an aperture stop disposed between an imaged object and the first lens element; wherein there are three lens elements with refractive power; and wherein the focal length of the photographing lens system is f, the focal length of the first lens element is f1, the focal length of the second lens element is f2, the radius of curvature of the object-side surface of the first lens element is R1, the Abbe number of the first lens element is V1, the Abbe number of the second lens element is V2, and they satisfy the relations: $1.28<f/f1<2.0$, $23.0<(R1/f)*100<33.0$, $30.5<V1-V2<46.0$, $-0.65<f/f2<-0.25$.

When the relation of $1.28<f/f1<2.0$ is satisfied, the refractive power of the first lens element is more balanced so that the total track length of the system can be effectively controlled to keep the photographing lens system compact. The above relation also prevents the high order spherical aberration from becoming too large, so that the image quality can be improved. Preferably, f and f1 satisfy the relation: $1.33<f/f1<1.70$. When the relation of $23.0<(R1/f)*100<33.0$ is satisfied, the total track length of the photographing lens system can be effectively reduced, and the high order aberrations can be prevented from becoming too large. Preferably, R1 and f satisfy the relation: $23.0<(R1/f)*100<29.0$. When the relation of $30.5<V1-V2<46.0$ is satisfied, the chromatic aberration of the photographing lens system can be favorably corrected. When the relation of $-0.65<f/f2<-0.25$ is satisfied, the correction of the chromatic aberration of the system can be enhanced more effectively. The above relation also prevents the refractive power of the second lens element from becoming too strong, thereby facilitating a reduction in the sensitivity of the photographing lens system.

In the aforementioned photographing lens system, it is preferable that the image-side surface of the first lens element is concave so that the first lens element is of a convex-concave shape (meniscus type), thereby facilitating the correction of the astigmatism of the system. Preferably, the second lens element has a concave object-side surface and a convex image-side surface so that the astigmatism of the system can be favorably corrected. Preferably, the third lens element has negative refractive power so that the principal point of the optical system can be positioned far away from the image plane; thereby the total track length of the system can be favorably reduced to keep the photographing lens system compact. Preferably, the third lens element has a convex object-side surface so as to facilitate the correction of the astigmatism and high order aberrations. Preferably, the second and third lens elements are made of plastic material. Plastic lens elements are not only favorable for the formation of aspheric surfaces but also facilitate a significant reduction in the production cost.

In the aforementioned photographing lens system, it is preferable that at least one of the object-side and image-side surfaces of the first lens element is aspheric. Aspheric surfaces can be easily made into non-spherical profiles, allowing more design parameter freedom which can be used to reduce aberrations and the number of the lens elements, so that the total track length of the photographing lens system can be effectively reduced and the image quality can be improved as well. Preferably, the first lens element is made of plastic material. Plastic lens elements are not only favorable for the formation of aspheric surfaces but also facilitate a significant reduction in the production cost.

In the aforementioned photographing lens system, the on-axis thickness of the second lens element is CT2, the focal length of the photographing lens system is f, and they preferably satisfy the relations: $2.0<(CT2/f)*100<12.0$, $0.10[mm]<CT2<0.38[mm]$. When the above relations are satisfied, the moldability and homogeneity of the plastic-injection-molded lenses can be improved, and the total track length of the system can be reduced more favorably.

In the aforementioned photographing lens system, the focal length of the photographing lens system is f, the focal length of the third lens element is f3, and they preferably satisfy the relation: $0<|f/f3|<0.25$. When the above relation is satisfied, the third lens element functions as a correction lens to balance and correct various kinds of aberration of the system, thereby the astigmatism and distortion of the system can be favorably corrected to improve the resolution of the photographing lens system.

In the aforementioned photographing lens system, the on-axis spacing between the second and third lens elements is T23, the focal length of the photographing lens system is f, and they preferably satisfy the relation: $13.0<(T23/f)*100<20.0$. When the above relation is satisfied, the high order aberrations of the photographing lens system can be favorably corrected.

In the aforementioned photographing lens system, the radius of curvature of the object-side surface of the third lens element is R5, the radius of curvature of the image-side surface of the third lens element is R6, and they preferably satisfy the relation: $0.5<R5/R6<2.0$. When the above relation is satisfied, the third lens element functions as a correction lens, thereby the high order aberrations of the system can be favorably corrected to improve image quality.

The aforementioned photographing lens system further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: $TTL/ImgH<1.85$. The above relation enables the photographing lens system to maintain a compact form so that it can be equipped in compact portable electronic products.

The present invention provides another photographing lens system comprising, in order from the object side to the image side: a first lens element with positive refractive power having a convex object-side surface; a second lens element with negative refractive power having a concave object-side surface and a convex image-side surface, the object-side and image-side surfaces thereof being aspheric; a third lens element having a concave image-side surface, the object-side and image-side surfaces thereof being aspheric and at least one of which being provided with at least one inflection point; and an aperture stop disposed between an imaged object and the second lens element; wherein there are three lens elements with refractive power; and wherein the radius of curvature of the object-side surface of the first lens element is R1, the focal length of the photographing lens system is f, the Abbe number of the first lens element is V1, the Abbe number of the second lens element is V2, the on-axis thickness of the second lens element is CT2, the on-axis spacing between the second and third lens elements is T23, and they satisfy the relations: $23.0<(R1/f)*100<33.0$, $30.5<V1-V2<46.0$, $2.0<(CT2/f)*100<12.0$, $0.10[mm]<CT2<0.38[mm]$, $10.0<(T23/f)*100<22.0$.

When the relation of $23.0<(R1/f)*100<33.0$ is satisfied, the total track length of the photographing lens system can be effectively reduced, and the high order aberrations can be prevented from becoming too large. When the relation of $30.5<V1-V2<46.0$ is satisfied, the chromatic aberration of the photographing lens system can be favorably corrected. When the relations of $2.0<(CT2/f)*100<12.0$ and $0.10[mm]<CT2<0.38[mm]$ are satisfied, the moldability and homogeneity of the plastic-injection-molded lenses can be improved, and the total track length of the system can be reduced more favorably. Preferably, CT2 and f satisfy the relations: $2.0<(CT2/f)*100<9.0$, $0.10[mm]<CT2<0.29[mm]$. When the relation of $10.0<(T23/f)*100<22.0$ is satisfied, the high order aberrations of the photographing lens system can be favorably corrected. Preferably, T23 and f satisfy the relation: $13.0<(T23/f)*100<20.0$.

In the aforementioned photographing lens system, it is preferable that the first lens element has a concave image-side surface and at least one of the object-side and image-side surfaces thereof is aspheric so that the astigmatism of the system can be favorably corrected. Preferably, the third lens element has negative refractive power so that the principal point of the optical system can be positioned far away from the image plane, thereby the total track length of the system can be favorably reduced to keep the photographing lens system compact. Preferably, the third lens element has a convex object-side surface so as to facilitate the correction of the astigmatism and high order aberrations of the system.

In the aforementioned photographing lens system, the focal length of the photographing lens system is f, the focal length of the first lens element is f1, and they preferably satisfy the relation: 1.28<f/f1<2.0. When the above relation is satisfied, the refractive power of the first lens element is more balanced so that the total track length of the system can be effectively controlled to keep the photographing lens system compact. The above relation also prevents the high order spherical aberration from becoming too large, so that the image quality can be improved. And it will be more preferable that f and f1 satisfy the relation: 1.33<f/f1<1.70.

In the aforementioned photographing lens system, it is preferable that the aperture stop is disposed between the imaged object and the first lens element so that the telecentric feature is emphasized, resulting in a shorter total track length.

In the aforementioned photographing lens system, the focal length of the photographing lens system is f, the focal length of the third lens element is f3, and they preferably satisfy the relation: 0<|f/f3|<0.25. When the above relation is satisfied, the third lens element functions as a correction lens to balance and correct various kinds of aberration of the system; thereby the astigmatism and distortion of the system can be favorably corrected to improve the resolution of the photographing lens system.

In the aforementioned photographing lens system, the focal length of the photographing lens system is f, the focal length of the second lens element is f2, and they preferably satisfy the relation: −0.65<f/f2<−0.25. When the above relation is satisfied, the correction of the chromatic aberration of the system can be enhanced more effectively. The above relation also prevents the refractive power of the second lens element from becoming too strong, thereby facilitating a reduction in the sensitivity of the photographing lens system.

In the aforementioned photographing lens system, the radius of curvature of the object-side surface of the third lens element is R5, the radius of curvature of the image-side surface of the third lens element is R6, and they preferably satisfy the relation: 0.5<R5/R6<2.0. When the above relation is satisfied, the third lens element functions as a correction lens, thereby the high order aberrations of the system can be favorably corrected to improve image quality.

The aforementioned photographing lens system further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<1.85. The above relation enables the photographing lens system to maintain a compact form so that it can be equipped in compact portable electronic products.

The present invention provides yet another photographing lens system comprising, in order from the object side to the image side: a first lens element with positive refractive power having a convex object-side surface and a convex image-side surface; a second lens element with negative refractive power, the object-side and image-side surfaces thereof being aspheric; a third lens element having a convex object-side surface and a concave image-side surface, the object-side and image-side surfaces thereof being aspheric and at least one of which being provided with at least one inflection point; and an aperture stop disposed between an imaged object and the second lens element; wherein there are three lens elements with refractive power; and wherein the focal length of the photographing lens system is f, the focal length of the first lens element is f1, the Abbe number of the first lens element is V1, the Abbe number of the second lens element is V2, the on-axis thickness of the second lens element is CT2, and they satisfy the relations: 1.28<f/f1<2.0, 30.5<V1−V2<46.0, 2.0<(CT2/f)*100<12.0, 0.10[mm]<CT2<0.38[mm].

When the relation of 1.28<f/f1<2.0 is satisfied, the refractive power of the first lens element is more balanced so that the total track length of the system can be effectively controlled to keep the photographing lens system compact. The above relation also prevents the high order spherical aberration from becoming too large, so that the image quality can be improved. Preferably, f and f1 satisfy the relation: 1.33<f/f1<1.70. When the relation of 30.5<V1−V2<46.0 is satisfied, the chromatic aberration of the photographing lens system can be favorably corrected. When the relations of 2.0<(CT2/f)*100<12.0 and 0.10[mm]<CT2<0.38[mm] are satisfied, the moldability and homogeneity of the plastic-injection-molded lenses can be improved, and the total track length of the system can be reduced more favorably. Preferably, CT2 and f satisfy the relations: 2.0<(CT2/f)*100<9.0, 0.10[mm]<CT2<0.29[mm].

In the aforementioned photographing lens system, it is preferable that the second lens element has a concave object-side surface and a convex image-side surface so that the astigmatism of the system can be favorably corrected. Preferably, the third lens element has negative refractive power so that the principal point of the optical system can be positioned far away from the image plane; thereby the total track length of the system can be favorably reduced to keep the photographing lens system compact. Preferably, the second and third lens elements are made of plastic material. Plastic lens elements are not only favorable for the formation of aspheric surfaces but also facilitate a significant reduction in the production cost.

In the aforementioned photographing lens system; it is preferable that the aperture stop is disposed between the imaged object and the first lens element so that the telecentric feature is emphasized, resulting in a shorter total track length.

In the aforementioned photographing lens system, the focal length of the photographing lens system is f, the focal length of the third lens element is f3, and they preferably satisfy the relation: 0<|f/f3|<0.25. When the above relation is satisfied, the third lens element functions as a correction lens to balance and correct various kinds of aberration of the system; thereby the astigmatism and distortion of the system can be favorably corrected to improve the resolution of the photographing lens system.

In the aforementioned photographing lens system, the on-axis spacing between the second and third lens elements is T23, the focal length of the photographing lens system is f, and they preferably satisfy the relation: 13.0<(T23/f)*100<20.0. When the above relation is satisfied, the high order aberrations of the photographing lens system can be favorably corrected.

In the aforementioned photographing lens system, the focal length of the photographing lens system is f, the focal length of the second lens element is f2, and they preferably satisfy the relation: −0.65<f/f2<−0.25. When the above relation is satisfied, the correction of the chromatic aberration of the system can be enhanced more effectively. The above relation also prevents the refractive power of the second lens element from becoming too strong, thereby facilitating a reduction in the sensitivity of the photographing lens system.

In the aforementioned photographing lens system, the radius of curvature of the object-side surface of the third lens element is R5, the radius of curvature of the image-side surface of the third lens element is R6, and they preferably satisfy the relation: 0.5<R5/R6<2.0. When the above relation is satisfied, the third lens element functions as a correction lens, thereby the high order aberrations of the system can be favorably corrected to improve image quality.

The aforementioned photographing lens system further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<1.85. The above relation enables the photographing lens system to maintain a compact form so that it can be equipped in compact portable electronic products.

In the present photographing lens system, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the photographing lens system can be effectively reduced.

In the present photographing lens system, if a lens element has a convex surface, it means the portion of the surface proximate to the axis is convex; if a lens element has a concave surface, it means the portion of the surface proximate to the axis is concave.

Preferred embodiments of the present invention will be described in the following paragraphs by referring to the accompanying drawings.

Figure 2:
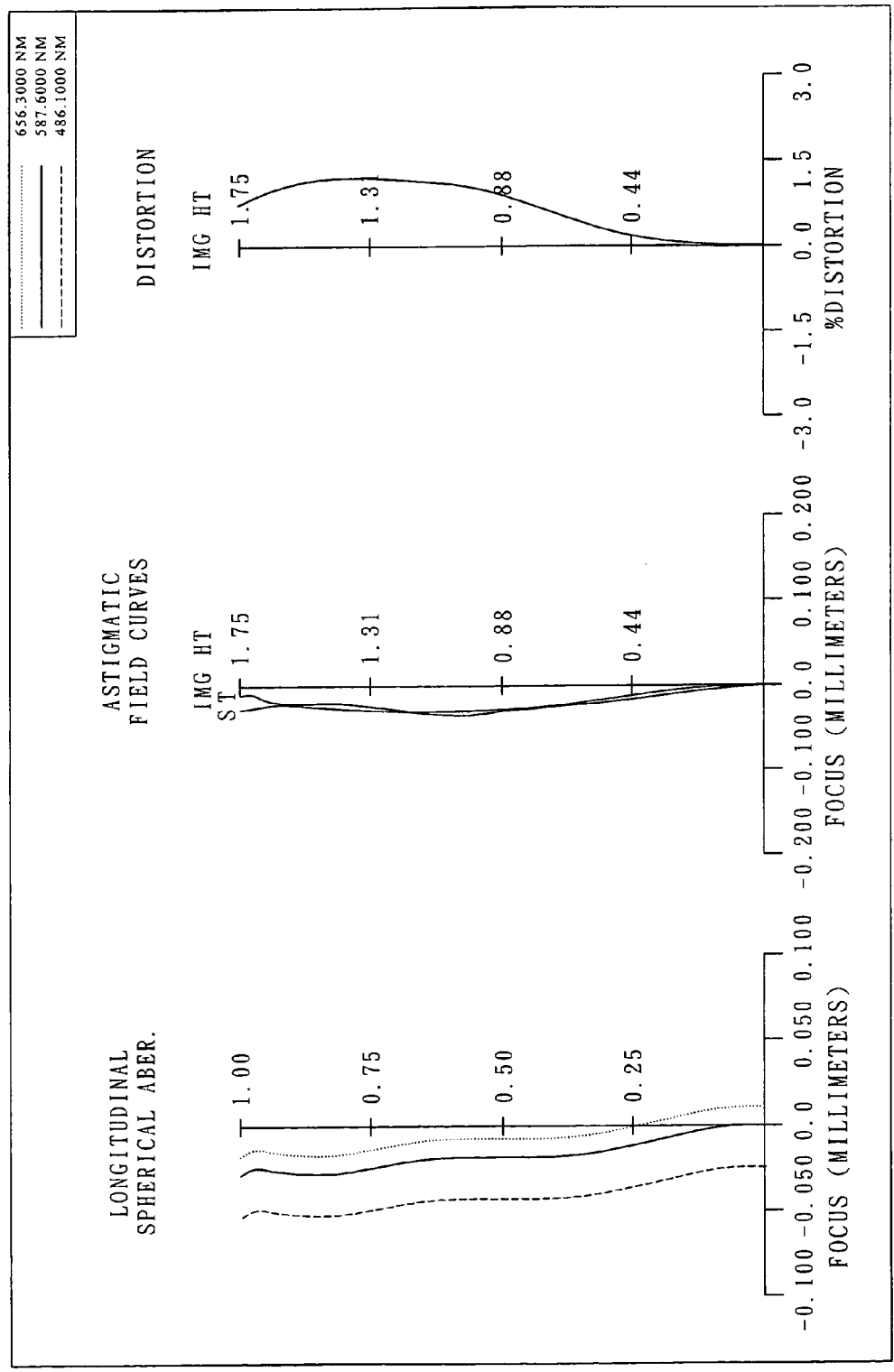
FIG. 2 shows the aberration curves of the first embodiment of the present invention.

FIG. 1 shows a photographing lens system in accordance with a first embodiment of the present invention, and FIG. 2 shows the aberration curves of the first embodiment of the present invention. The photographing lens system of the first embodiment of the present invention mainly comprises three lens elements, in order from the object side to the image side: a plastic first lens element 110 with positive refractive power having a convex object-side surface 111 and a concave image-side surface 112, the object-side and image-side surfaces 111 and 112 thereof being aspheric; a plastic second lens element 120 with negative refractive power having a concave object-side surface 121 and a convex image-side surface 122, the object-side and image-side surfaces 121 and 122 thereof being aspheric; and a plastic third lens element 130 with negative refractive power having a convex object-side surface 131 and a concave image-side surface 132, the object-side and image-side surfaces 131 and 132 thereof being aspheric and each of which being provided with at least one inflection point; wherein an aperture stop 100 is disposed between an imaged object and the first lens element 110; wherein an IR filter 140 is disposed between the image-side surface 132 of the third lens element 130 and an image plane 150; and wherein the IR filter 140 is made of glass and has no influence on the focal length of the photographing lens system.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing lens system, the focal length of the photographing lens system is f, and it satisfies the relation: f=2.70 (mm).

In the first embodiment of the present photographing lens system, the f-number of the photographing lens system is Fno, and it satisfies the relation: Fno=2.80.

In the first embodiment of the present photographing lens system, half of the maximal field of view of the photographing lens system is HFOV, and it satisfies the relation: HFOV=32.7 deg.

In the first embodiment of the present photographing lens system, the Abbe number of the first lens element 110 is V1, the Abbe number of the second lens element 120 is V2, and they satisfy the relation: V1−V2=32.5.

In the first embodiment of the present photographing lens system, the on-axis thickness of the second lens element 120 is CT2, and it satisfies the relation: CT2=0.280 (mm).

In the first embodiment of the present photographing lens system, the on-axis thickness of the second lens element 120 is CT2, the focal length of the photographing lens system is f, and they satisfy the relation: (CT2/f)*100=10.4.

In the first embodiment of the present photographing lens system, the radius of curvature of the object-side surface 111 of the first lens element 110 is R1, the focal length of the photographing lens system is f, and they satisfy the relation: (R1/f)*100=28.2.

In the first embodiment of the present photographing lens system, the on-axis spacing between the second lens element 120 and the third lens element 130 is T23, the focal length of the photographing lens system is f, and they satisfy the relation: (T23/f)*100=15.0.

In the first embodiment of the present photographing lens system, the radius of curvature of the object-side surface 131 of the third lens element 130 is R5, the radius of curvature of the image-side surface 132 of the third lens element 130 is R6, and they satisfy the relation: R5/R6=1.38.

In the first embodiment of the present photographing lens system, the focal length of the photographing lens system is f, the focal length of the first lens element 110 is f1, and they satisfy the relation: f/f1=1.39.

In the first embodiment of the present photographing lens system, the focal length of the photographing lens system is f, the focal length of the second lens element 120 is f2, and they satisfy the relation: f/f2=−0.42.

In the first embodiment of the present photographing lens system, the focal length of the photographing lens system is f, the focal length of the third lens element 130 is f3, and they satisfy the relation: |f/f3|=0.16.

In the first embodiment of the present photographing lens system, the image plane 150 is provided with an electronic sensor on which an object is imaged. The on-axis spacing between the object-side surface 111 of the first lens element 110 and the electronic sensor is TTL, half of the diagonal length of the effective pixel area of the electronic sensor is ImgH, and they satisfy the relation: TTL/ImgH=1.62.

The detailed optical data of the first embodiment is shown in FIG. 17 (TABLE 1), and the aspheric surface data is shown in FIGS. 18A and 18B (TABLES 2A and 2B), wherein the units of the radius of curvature, the thickness and the focal length are expressed in mm, and HFOV is half of the maximal field of view.

Figure 3:
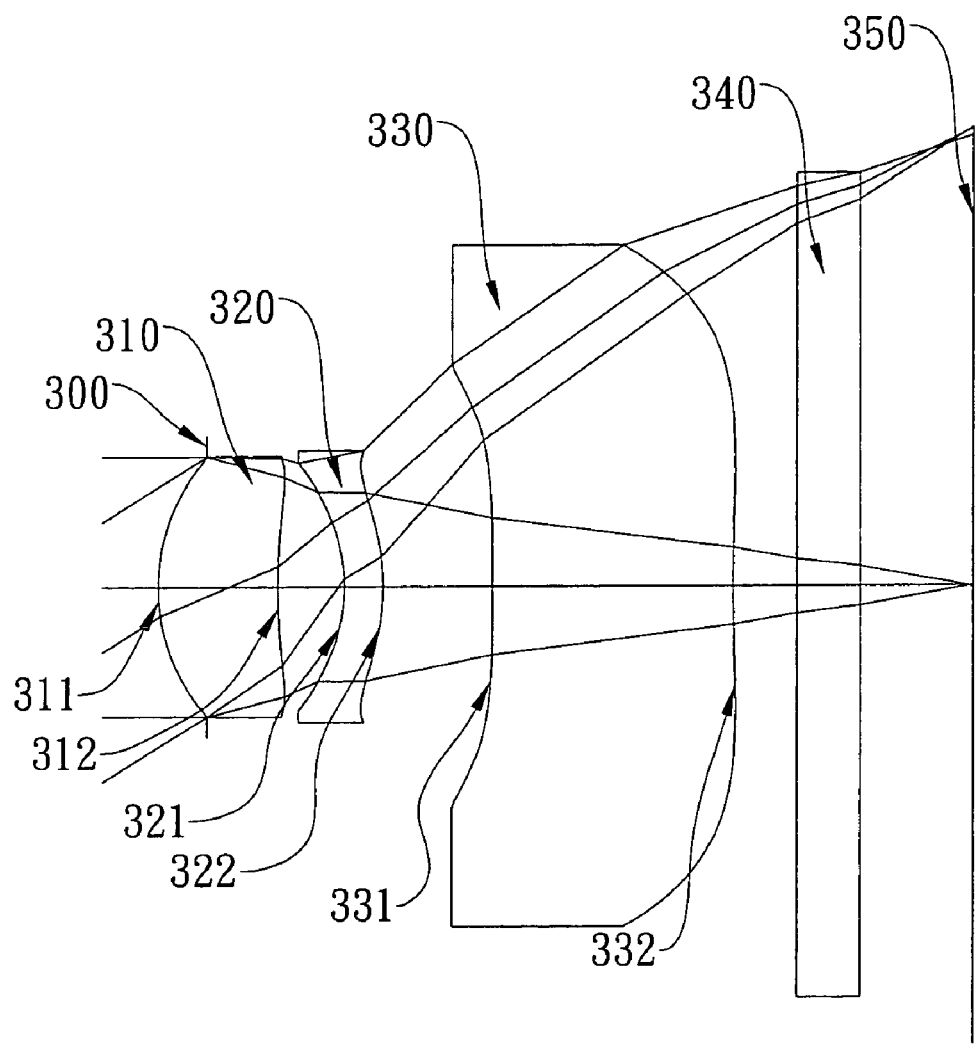
FIG. 3 shows a photographing lens system in accordance with a second embodiment of the present invention.
Figure 4:
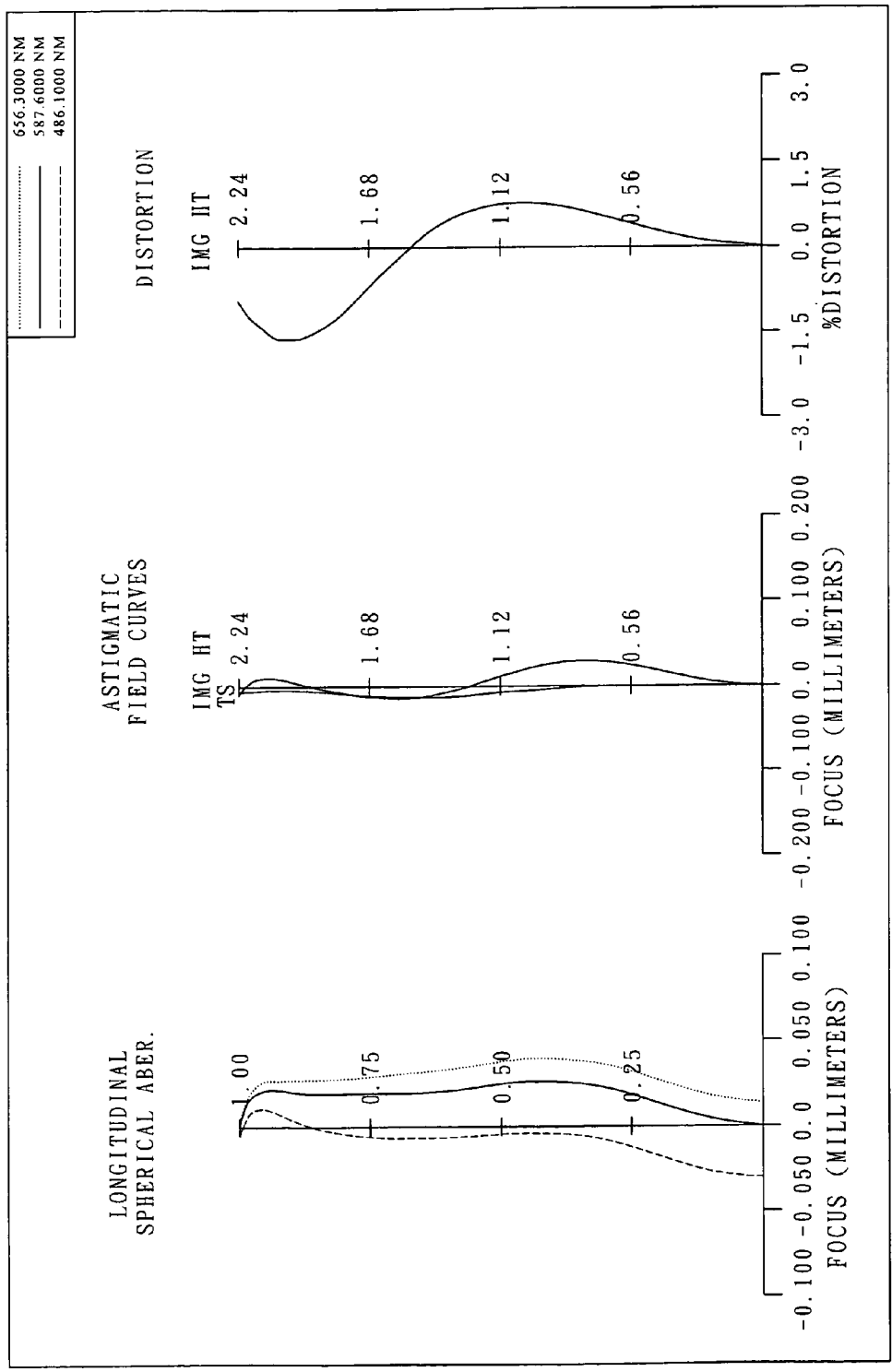
FIG. 4 shows the aberration curves of the second embodiment of the present invention.

FIG. 3 shows a photographing lens system in accordance with a second embodiment of the present invention, and FIG. 4 shows the aberration curves of the second embodiment of the present invention. The photographing lens system of the second embodiment of the present invention mainly comprises three lens elements, in order from the object side to the image side: a plastic first lens element 310 with positive refractive power having a convex object-side surface 311 and a concave image-side surface 312, the object-side and image-side surfaces 311 and 312 thereof being aspheric; a plastic second lens element 320 with negative refractive power having a concave object-side surface 321 and a convex image-side surface 322, the object-side and image-side surfaces 321 and 322 thereof being aspheric; and a plastic third lens element 330 with negative refractive power having a concave object-side surface 331 and a concave image-side surface 332, the object-side and image-side surfaces 331 and 332 thereof being aspheric and each of which being provided with at least one inflection point; wherein an aperture stop 300 is disposed between an imaged object and the first lens element 310; wherein an IR filter 340 is disposed between the image-side surface 332 of the third lens element 330 and an image plane 350; and wherein the IR filter 340 is made of glass and has no influence on the focal length of the photographing lens system.

The equation of the aspheric surface profiles of the second embodiment has the same form as that of the first embodiment.

In the second embodiment of the present photographing lens system, the focal length of the photographing lens system is f, and it satisfies the relation: f=3.53 (mm).

In the second embodiment of the present photographing lens system, the f-number of the photographing lens system is Fno, and it satisfies the relation: Fno=2.78.

In the second embodiment of the present photographing lens system, half of the maximal field of view of the photographing lens system is HFOV, and it satisfies the relation: HFOV=32.6 deg.

In the second embodiment of the present photographing lens system, the Abbe number of the first lens element 310 is V1, the Abbe number of the second lens element 320 is V2, and they satisfy the relation: V1−V2=32.5.

In the second embodiment of the present photographing lens system, the on-axis thickness of the second lens element 320 is CT2, and it satisfies the relation: CT2=0.187 (mm).

In the second embodiment of the present photographing lens system, the on-axis thickness of the second lens element 320 is CT2, the focal length of the photographing lens system is f, and they satisfy the relation: (CT2/f)*100=5.3.

In the second embodiment of the present photographing lens system, the radius of curvature of the object-side surface 311 of the first lens element 310 is R1, the focal length of the photographing lens system is f, and they satisfy the relation: (R1/f)*100=28.4.

In the second embodiment of the present photographing lens system, the on-axis spacing between the second lens element 320 and the third lens element 330 is T23, the focal length of the photographing lens system is f, and they satisfy the relation: (T23/f)*100=14.6.

In the second embodiment of the present photographing lens system, the radius of curvature of the object-side surface 331 of the third lens element 330 is R5, the radius of curvature of the image-side surface 332 of the third lens element 330 is R6, and they satisfy the relation: R5/R6=−9.18.

In the second embodiment of the present photographing lens system, the focal length of the photographing lens system is f, the focal length of the first lens element 310 is f1, and they satisfy the relation: f/f1=1.44.

In the second embodiment of the present photographing lens system, the focal length of the photographing lens system is f, the focal length of the second lens element 320 is f2, and they satisfy the relation: f/f2=−0.41.

In the second embodiment of the present photographing lens system, the focal length of the photographing lens system is f, the focal length of the third lens element 330 is f3, and they satisfy the relation: |f/f3|=0.26.

In the second embodiment of the present photographing lens system, the image plane 350 is provided with an electronic sensor on which an object is imaged. The on-axis spacing between the object-side surface 311 of the first lens element 310 and the electronic sensor is TTL, half of the diagonal length of the effective pixel area of the electronic sensor is ImgH, and they satisfy the relation: TTL/ImgH=1.69.

The detailed optical data of the second embodiment is shown in FIG. 19 (TABLE 3), and the aspheric surface data is shown in FIGS. 20A and 20B (TABLES 4A and 4B), wherein the units of the radius of curvature, the thickness and the focal length are expressed in mm, and HFOV is half of the maximal field of view.

Figure 5:
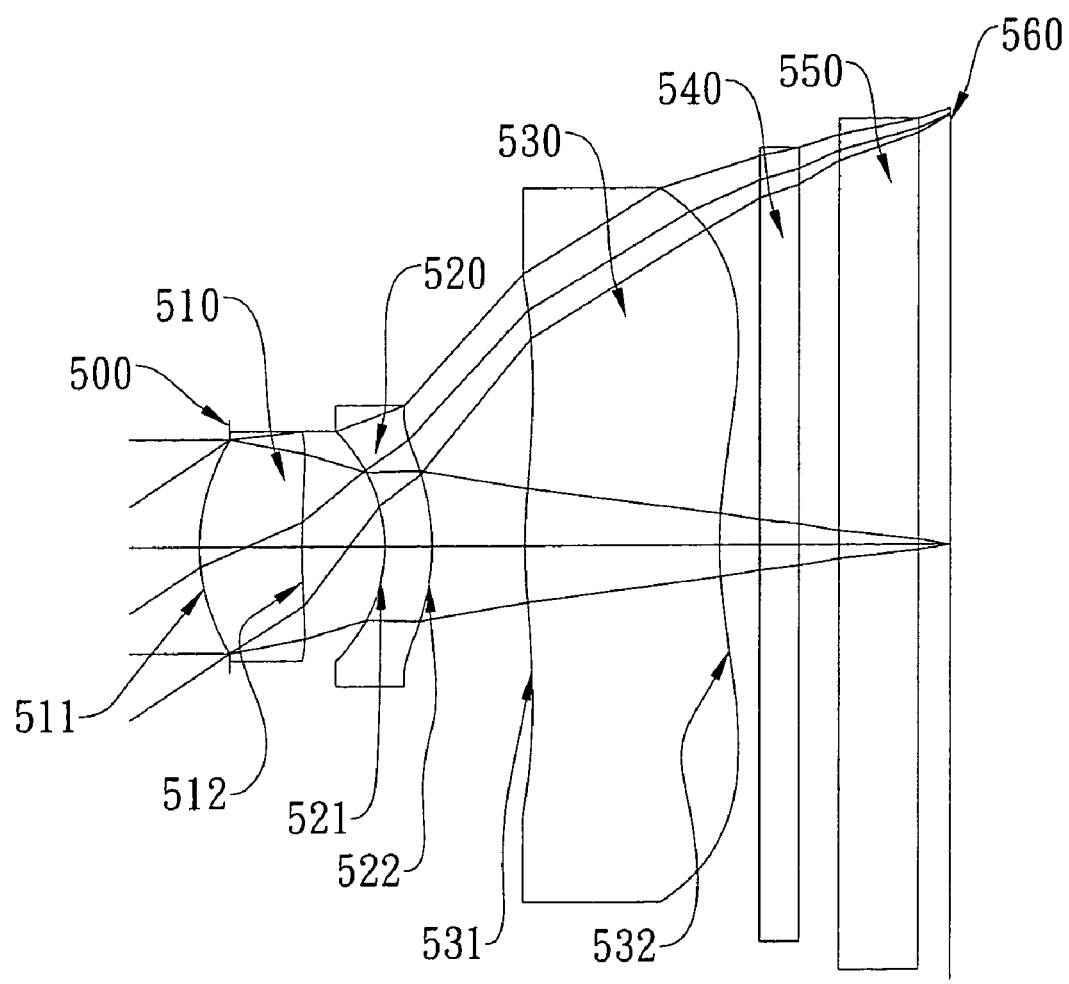
FIG. 5 shows a photographing lens system in accordance with a third embodiment of the present invention.
Figure 6:
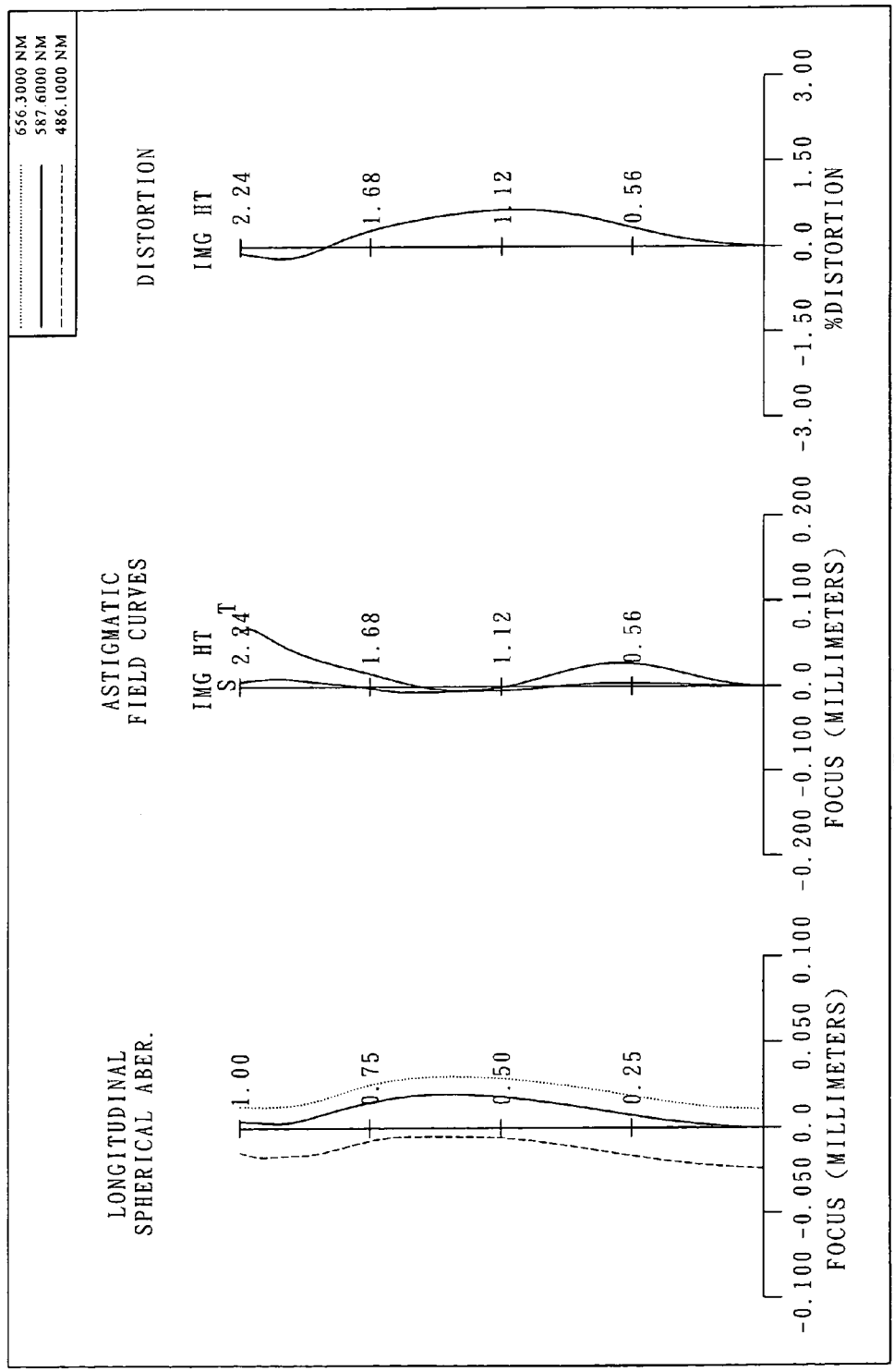
FIG. 6 shows the aberration curves of the third embodiment of the present invention.

FIG. 5 shows a photographing lens system in accordance with a third embodiment of the present invention, and FIG. 6 shows the aberration curves of the third embodiment of the present invention. The photographing lens system of the third embodiment of the present invention mainly comprises three lens elements, in order from the object side to the image side: a plastic first lens element 510 with positive refractive power having a convex object-side surface 511 and a concave image-side surface 512, the object-side and image-side surfaces 511 and 512 thereof being aspheric; a plastic second lens element 520 with negative refractive power having a concave object-side surface 521 and a convex image-side surface 522, the object-side and image-side surfaces 521 and 522 thereof being aspheric; and a plastic third lens element 530 with negative refractive power having a convex object-side surface 531 and a concave image-side surface 532, the object-side and image-side surfaces 531 and 532 thereof being aspheric and each of which being provided with at least one inflection point; wherein an aperture stop 500 is disposed between an imaged object and the first lens element 510; wherein an IR filter 540 and a cover glass 550 are sequentially disposed between the image-side surface 532 of the third lens element 530 and an image plane 560; and wherein the IR filter 540 and the cover glass 550 are made of glass and have no influence on the focal length of the photographing lens system.

The equation of the aspheric surface profiles of the third embodiment has the same form as that of the first embodiment.

In the third embodiment of the present photographing lens system, the focal length of the photographing lens system is f, and it satisfies the relation: f=3.23 (mm).

In the third embodiment of the present photographing lens system, the f-number of the photographing lens system is Fno, and it satisfies the relation: Fno=2.88.

In the third embodiment of the present photographing lens system, half of the maximal field of view of the photographing lens system is HFOV, and it satisfies the relation: HFOV=34.9 deg.

In the third embodiment of the present photographing lens system, the Abbe number of the first lens element 510 is V1, the Abbe number of the second lens element 520 is V2, and they satisfy the relation: V1−V2=32.5.

In the third embodiment of the present photographing lens system, the on-axis thickness of the second lens element 520 is CT2, and it satisfies the relation: CT2=0.246 (mm).

In the third embodiment of the present photographing lens system, the on-axis thickness of the second lens element 520 is CT2, the focal length of the photographing lens system is f, and they satisfy the relation: (CT2/f)*100=7.6.

In the third embodiment of the present photographing lens system, the radius of curvature of the object-side surface 511 of the first lens element 510 is R1, the focal length of the photographing lens system is f, and they satisfy the relation: (R1/f)*100=33.2.

In the third embodiment of the present photographing lens system, the on-axis spacing between the second lens element 520 and the third lens element 530 is T23, the focal length of the photographing lens system is f, and they satisfy the relation: (T23/f)*100=14.7.

In the third embodiment of the present photographing lens system, the radius of curvature of the object-side surface 531 of the third lens element 530 is R5, the radius of curvature of the image-side surface 532 of the third lens element 530 is R6, and they satisfy the relation: R5/R6=1.23.

In the third embodiment of the present photographing lens system, the focal length of the photographing lens system is f, the focal length of the first lens element 510 is f1, and they satisfy the relation: f/f1=1.33.

In the third embodiment of the present photographing lens system, the focal length of the photographing lens system is f, the focal length of the second lens element 520 is f2, and they satisfy the relation: f/f2=−0.47.

In the third embodiment of the present photographing lens system, the focal length of the photographing lens system is f, the focal length of the third lens element 530 is f3, and they satisfy the relation: |f/f3|=0.05.

In the third embodiment of the present photographing lens system, the image plane 560 is provided with an electronic sensor on which an object is imaged. The on-axis spacing between the object-side surface 511 of the first lens element 510 and the electronic sensor is TTL, half of the diagonal length of the effective pixel area of the electronic sensor is ImgH, and they satisfy the relation: TTL/ImgH=1.61.

The detailed optical data of the third embodiment is shown in FIG. 21 (TABLE 5), and the aspheric surface data is shown in FIG. 22 (TABLE 6), wherein the units of the radius of curvature, the thickness and the focal length are expressed in mm, and HFOV is half of the maximal field of view.

Figure 7:
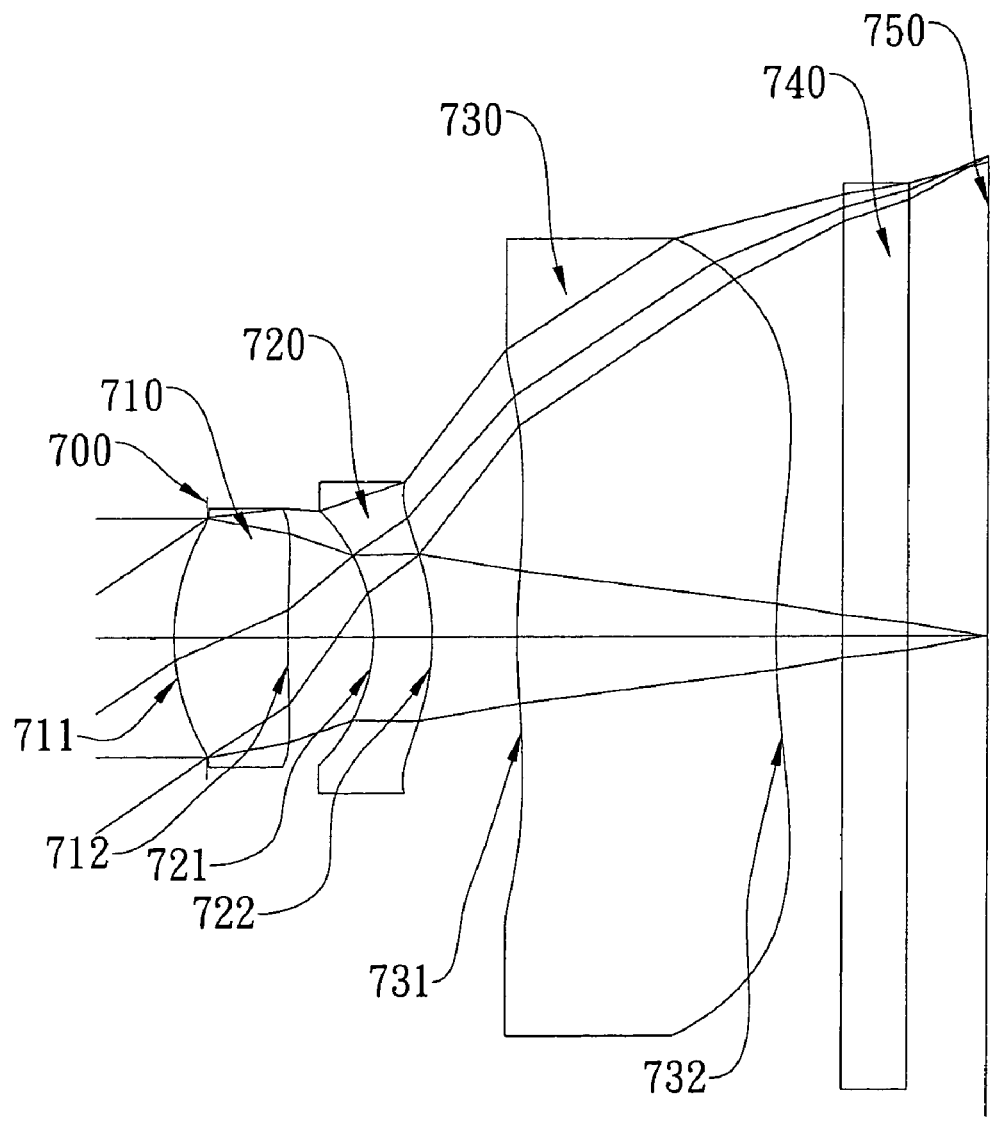
FIG. 7 shows a photographing lens system in accordance with a fourth embodiment of the present invention.
Figure 8:
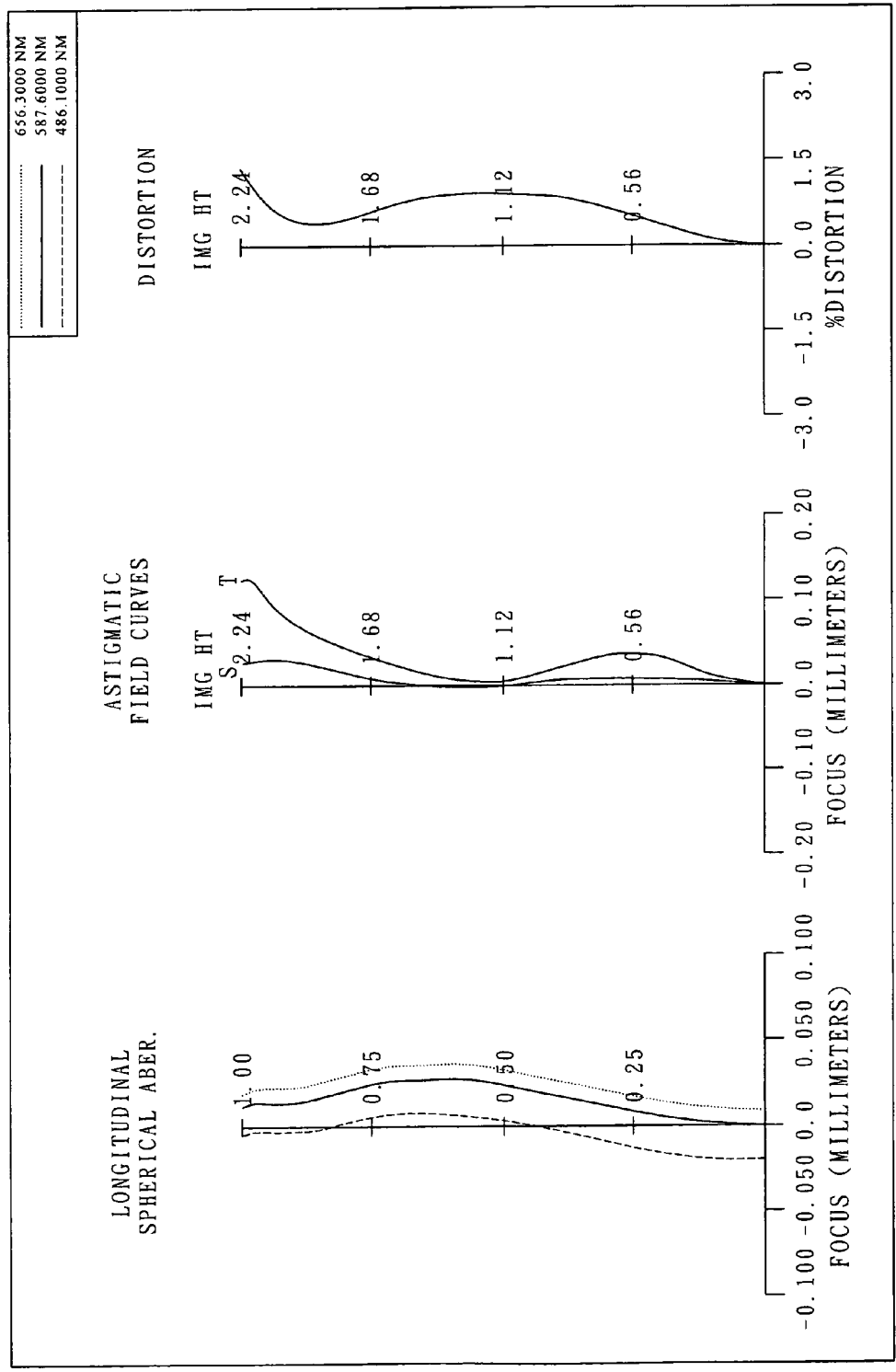
FIG. 8 shows the aberration curves of the fourth embodiment of the present invention.

FIG. 7 shows a photographing lens system in accordance with a fourth embodiment of the present invention, and FIG. 8 shows the aberration curves of the fourth embodiment of the present invention. The photographing lens system of the fourth embodiment of the present invention mainly comprises three lens elements, in order from the object side to the image side: a plastic first lens element 710 with positive refractive power having a convex object-side surface 711 and a concave image-side surface 712, the object-side and image-side surfaces 711 and 712 thereof being aspheric; a plastic second lens element 720 with negative refractive power having a concave object-side surface 721 and a convex image-side surface 722, the object-side and image-side surfaces 721 and 722 thereof being aspheric; and a plastic third lens element 730 with positive refractive power having a convex object-side surface 731 and a concave image-side surface 732, the object-side and image-side surfaces 731 and 732 thereof being aspheric and each of which being provided with at least one inflection point; wherein an aperture stop 700 is disposed between an imaged object and the first lens element 710; wherein an IR filter 740 is disposed between the image-side surface 732 of the third lens element 730 and an image plane 750; and wherein the IR filter 740 is made of glass and has no influence on the focal length of the photographing lens system.

The equation of the aspheric surface profiles of the fourth embodiment has the same form as that of the first embodiment.

In the fourth embodiment of the present photographing lens system, the focal length of the photographing lens system is f, and it satisfies the relation: f=3.14 (mm).

In the fourth embodiment of the present photographing lens system, the f-number of the photographing lens system is Fno, and it satisfies the relation: Fno=2.78.

In the fourth embodiment of the present photographing lens system, half of the maximal field of view of the photographing lens system is HFOV, and it satisfies the relation: HFOV=35.3 deg.

In the fourth embodiment of the present photographing lens system, the Abbe number of the first lens element 710 is V1, the Abbe number of the second lens element 720 is V2, and they satisfy the relation: V1−V2=32.5.

In the fourth embodiment of the present photographing lens system, the on-axis thickness of the second lens element 720 is CT2, and it satisfies the relation: CT2=0.266 (mm).

In the fourth embodiment of the present photographing lens system, the on-axis thickness of the second lens element 720 is CT2, the focal length of the photographing lens system is f, and they satisfy the relation: (CT2/f)*100=8.5.

In the fourth embodiment of the present photographing lens system, the radius of curvature of the object-side surface 711 of the first lens element 710 is R1, the focal length of the photographing lens system is f, and they satisfy the relation: (R1/f)*100=33.5.

In the fourth embodiment of the present photographing lens system, the on-axis spacing between the second lens element 720 and the third lens element 730 is T23, the focal length of the photographing lens system is f, and they satisfy the relation: (T23/f)*100=12.3.

In the fourth embodiment of the present photographing lens system, the radius of curvature of the object-side surface 731 of the third lens element 730 is R5, the radius of curvature of the image-side surface 732 of the third lens element 730 is R6, and they satisfy the relation: R5/R6=1.07.

In the fourth embodiment of the present photographing lens system, the focal length of the photographing lens system is f, the focal length of the first lens element 710 is f1, and they satisfy the relation: f/f1=1.38.

In the fourth embodiment of the present photographing lens system, the focal length of the photographing lens system is f, the focal length of the second lens element 720 is f2, and they satisfy the relation: f/f2=−0.60.

In the fourth embodiment of the present photographing lens system, the focal length of the photographing lens system is f, the focal length of the third lens element 730 is f3, and they satisfy the relation: |f/f3|=0.03.

In the fourth embodiment of the present photographing lens system, the image plane 750 is provided with an electronic sensor on which an object is imaged. The on-axis spacing between the object-side surface 711 of the first lens element 710 and the electronic sensor is TTL, half of the diagonal length of the effective pixel area of the electronic sensor is ImgH, and they satisfy the relation: TTL/ImgH=1.61.

The detailed optical data of the fourth embodiment is shown in FIG. 23 (TABLE 7), and the aspheric surface data is shown in FIGS. 24A and 24B (TABLES 8A and 8B), wherein the units of the radius of curvature, the thickness and the focal length are expressed in mm, and HFOV is half of the maximal field of view.

Figure 9:
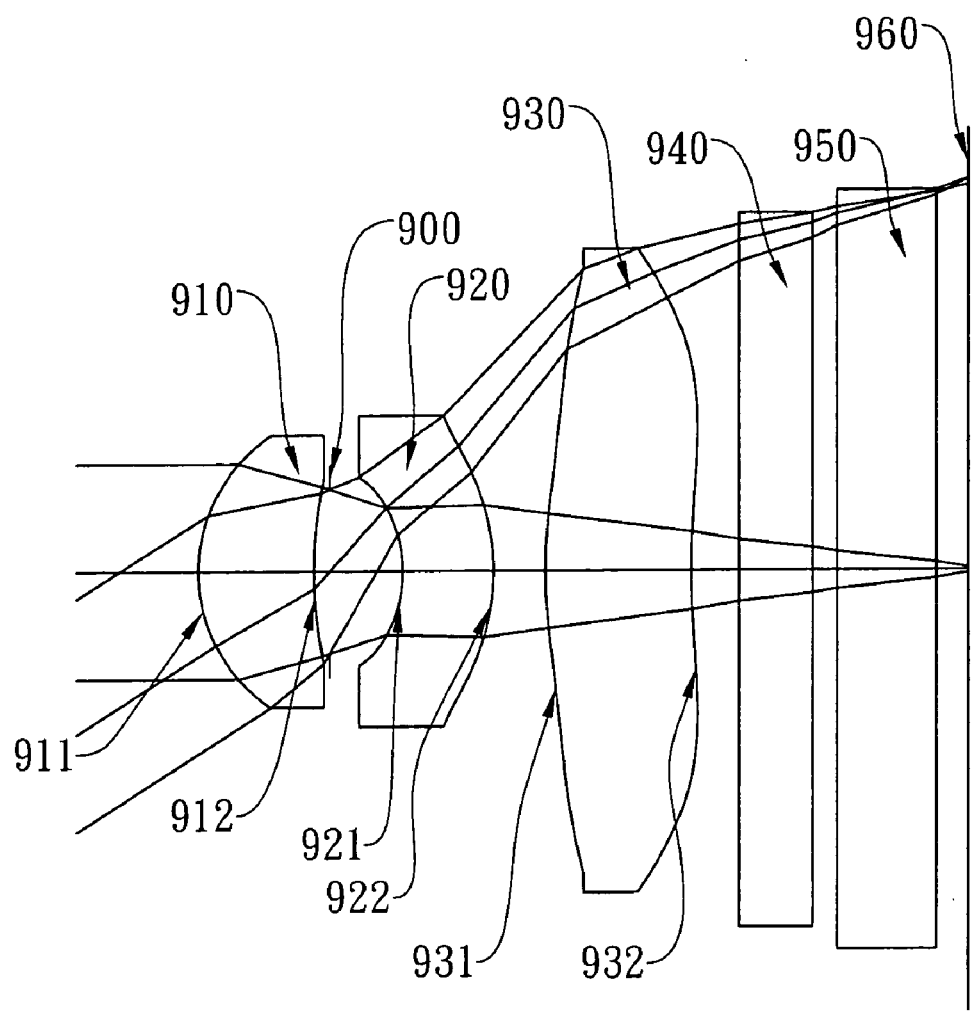
FIG. 9 shows a photographing lens system in accordance with a fifth embodiment of the present invention.
Figure 10:
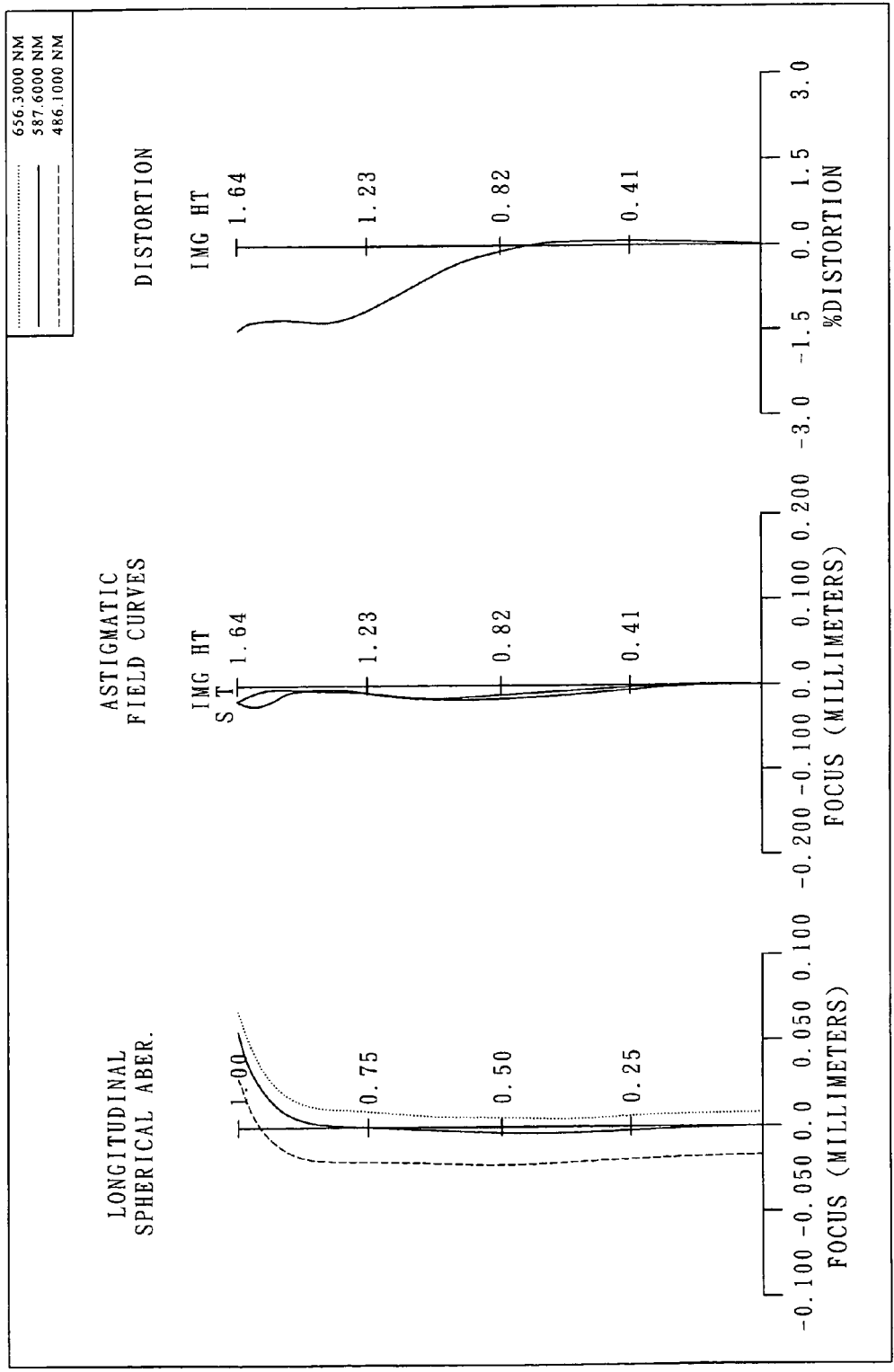
FIG. 10 shows the aberration curves of the fifth embodiment of the present invention.

FIG. 9 shows a photographing lens system in accordance with a fifth embodiment of the present invention, and FIG. 10 shows the aberration curves of the fifth embodiment of the present invention. The photographing lens system of the fifth embodiment of the present invention mainly comprises three lens elements, in order from the object side to the image side: a plastic first lens element 910 with positive refractive power having a convex object-side surface 911 and a concave image-side surface 912, the object-side and image-side surfaces 911 and 912 thereof being aspheric; a plastic second lens element 920 with negative refractive power having a concave object-side surface 921 and a convex image-side surface 922, the object-side and image-side surfaces 921 and 922 thereof being aspheric; and a plastic third lens element 930 with positive refractive power having a convex object-side surface 931 and a concave image-side surface 932, the object-side and image-side surfaces 931 and 932 thereof being aspheric and each of which being provided with at least one inflection point; wherein an aperture stop 900 is disposed between the first lens element 910 and the second lens element 920; wherein an IR filter 940 and a cover glass 950 are sequentially disposed between the image-side surface 932 of the third lens element 930 and an image plane 960; and wherein the IR filter 940 and the cover glass 950 are made of glass and have no influence on the focal length of the photographing lens system.

The equation of the aspheric surface profiles of the fifth embodiment has the same form as that of the first embodiment.

In the fifth embodiment of the present photographing lens system, the focal length of the photographing lens system is f, and it satisfies the relation: f=2.57 (mm).

In the fifth embodiment of the present photographing lens system, the f-number of the photographing lens system is Fno, and it satisfies the relation: Fno=2.85.

In the fifth embodiment of the present photographing lens system, half of the maximal field of view of the photographing lens system is HFOV, and it satisfies the relation: HFOV=33.0 deg.

In the fifth embodiment of the present photographing lens system, the Abbe number of the first lens element 910 is V1, the Abbe number of the second lens element 920 is V2, and they satisfy the relation: V1−V2=32.5.

In the fifth embodiment of the present photographing lens system, the on-axis thickness of the second lens element 920 is CT2, and it satisfies the relation: CT2=0.367 (mm).

In the fifth embodiment of the present photographing lens system, the on-axis thickness of the second lens element 920 is CT2, the focal length of the photographing lens system is f, and they satisfy the relation: (CT2/f)*100=14.3.

In the fifth embodiment of the present photographing lens system, the radius of curvature of the object-side surface 911 of the first lens element 910 is R1, the focal length of the photographing lens system is f, and they satisfy the relation: (R1/f)*100=27.7.

In the fifth embodiment of the present photographing lens system, the on-axis spacing between the second lens element 920 and the third lens element 930 is T23, the focal length of the photographing lens system is f, and they satisfy the relation: (T23/f)*100=8.1.

In the fifth embodiment of the present photographing lens system, the radius of curvature of the object-side surface 931 of the third lens element 930 is R5, the radius of curvature of the image-side surface 932 of the third lens element 930 is R6, and they satisfy the relation: R5/R6=0.56.

In the fifth embodiment of the present photographing lens system, the focal length of the photographing lens system is f, the focal length of the first lens element 910 is f1, and they satisfy the relation: f/f1=1.40.

In the fifth embodiment of the present photographing lens system, the focal length of the photographing lens system is f, the focal length of the second lens element 920 is f2, and they satisfy the relation: f/f2=−0.79.

In the fifth embodiment of the present photographing lens system, the focal length of the photographing lens system is f, the focal length of the third lens element 930 is f3, and they satisfy the relation: |f/f3|=0.37.

In the fifth embodiment of the present photographing lens system, the image plane 960 is provided with an electronic sensor on which an object is imaged. The on-axis spacing between the object-side surface 911 of the first lens element 910 and the electronic sensor is TTL, half of the diagonal length of the effective pixel area of the electronic sensor is ImgH, and they satisfy the relation: TTL/ImgH=1.77.

The detailed optical data of the fifth embodiment is shown in FIG. 25 (TABLE 9), and the aspheric surface data is shown in FIG. 26 (TABLE 10), wherein the units of the radius of curvature, the thickness and the focal length are expressed in mm, and HFOV is half of the maximal field of view.

Figure 11:
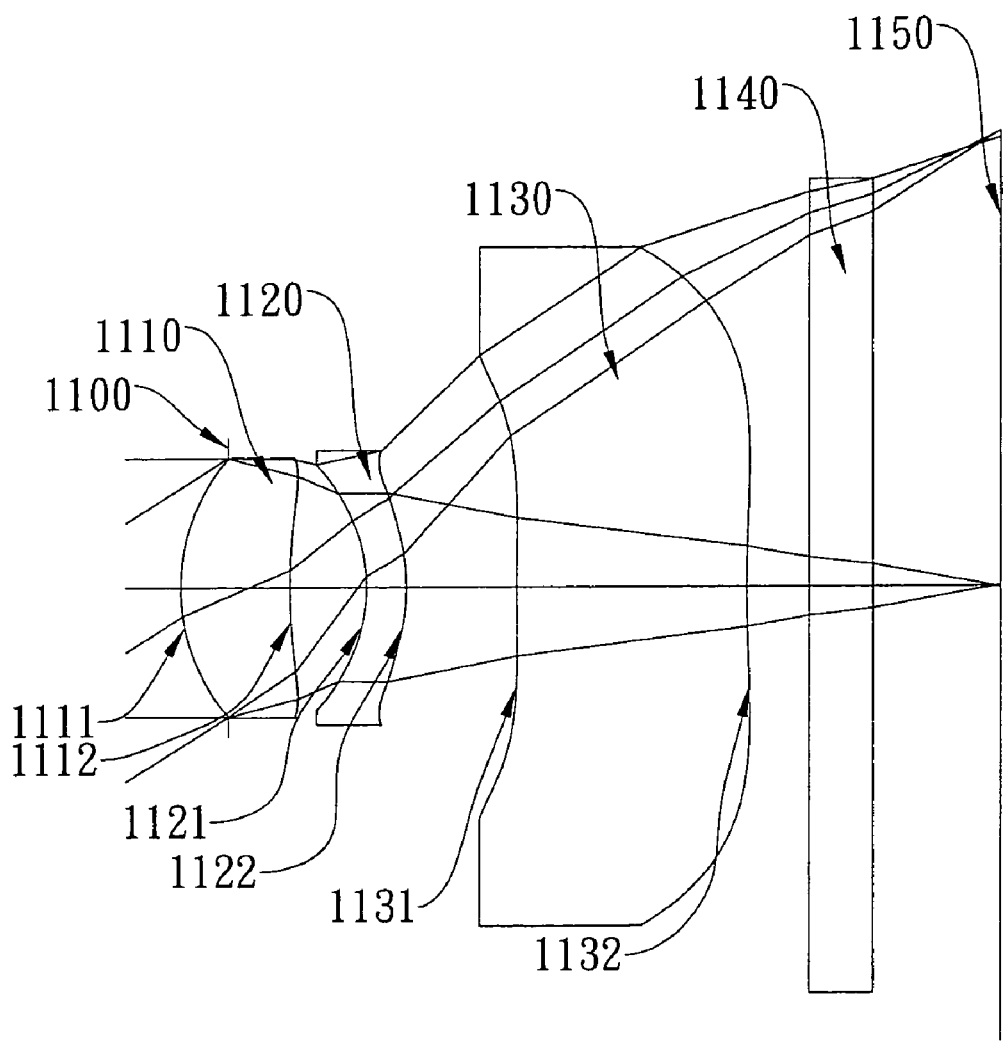
FIG. 11 shows a photographing lens system in accordance with a sixth embodiment of the present invention.
Figure 12:
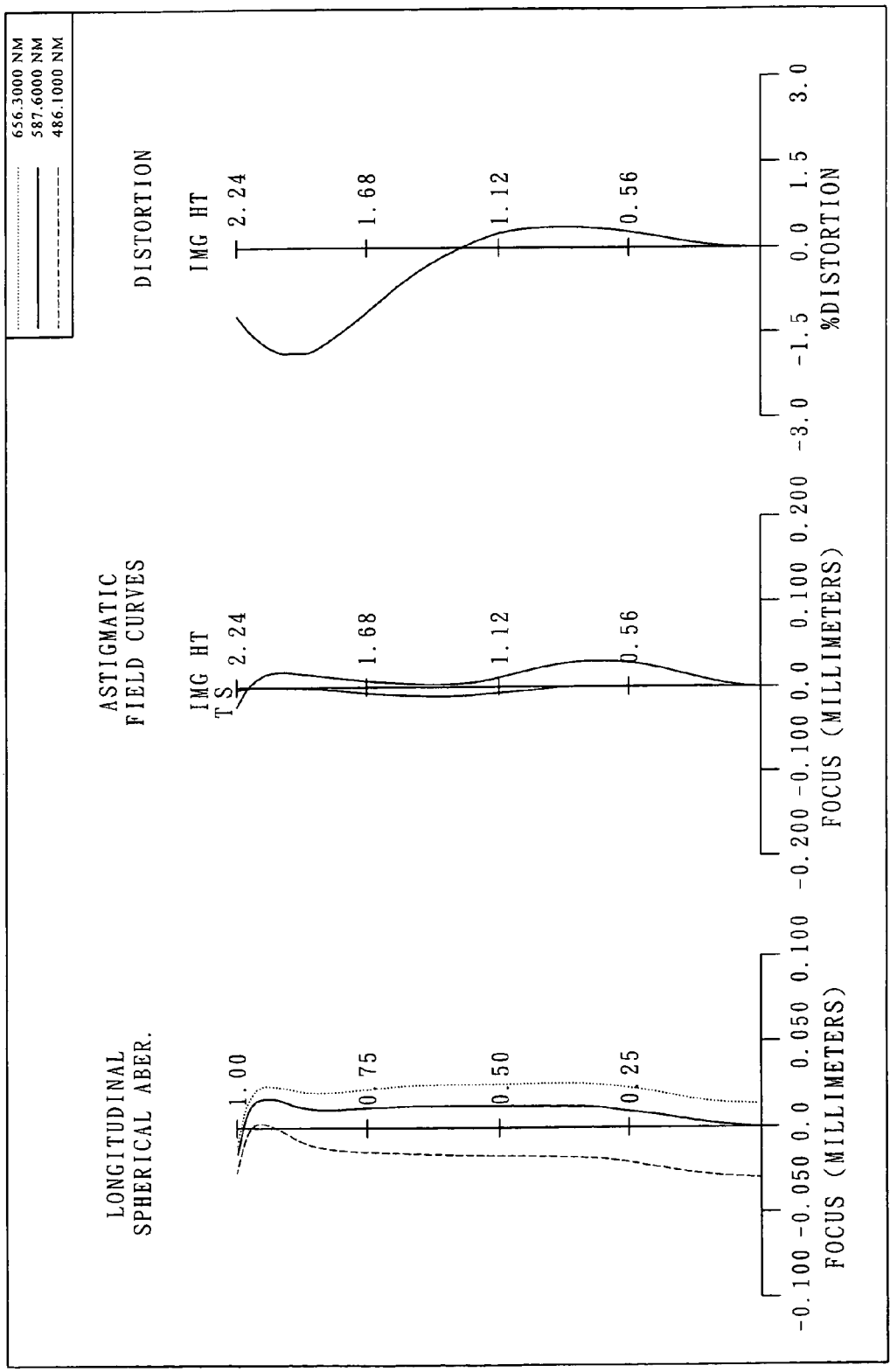
FIG. 12 shows the aberration curves of the sixth embodiment of the present invention.

FIG. 11 shows a photographing lens system in accordance with a sixth embodiment of the present invention, and FIG. 12 shows the aberration curves of the sixth embodiment of the present invention. The photographing lens system of the sixth embodiment of the present invention mainly comprises three lens elements, in order from the object side to the image side: a plastic first lens element 1110 with positive refractive power having a convex object-side surface 1111 and a concave image-side surface 1112, the object-side and image-side surfaces 1111 and 1112 thereof being aspheric; a plastic second lens element 1120 with negative refractive power having a concave object-side surface 1121 and a convex image-side surface 1122, the object-side and image-side surfaces 1121 and 1122 thereof being aspheric; and a plastic third lens element 1130 with negative refractive power having a convex object-side surface 1131 and a concave image-side surface 1132, the object-side and image-side surfaces 1131 and 1132 thereof being aspheric and each of which being provided with at least one inflection point; wherein an aperture stop 1100 is disposed between an imaged object and the first lens element 1110; wherein an IR filter 1140 is disposed between the image-side surface 1132 of the third lens element 1130 and an image plane 1150; and wherein the IR filter 1140 is made of glass and has no influence on the focal length of the photographing lens system.

The equation of the aspheric surface profiles of the sixth embodiment has the same form as that of the first embodiment.

In the sixth embodiment of the present photographing lens system, the focal length of the photographing lens system is f, and it satisfies the relation: f=3.57 (mm).

In the sixth embodiment of the present photographing lens system, the f-number of the photographing lens system is Fno, and it satisfies the relation: Fno=2.78.

In the sixth embodiment of the present photographing lens system, half of the maximal field of view of the photographing lens system is HFOV, and it satisfies the relation: HFOV=32.6 deg.

In the sixth embodiment of the present photographing lens system, the Abbe number of the first lens element 1110 is V1, the Abbe number of the second lens element 1120 is V2, and they satisfy the relation: V1−V2=32.5.

In the sixth embodiment of the present photographing lens system, the on-axis thickness of the second lens element 1120 is CT2, and it satisfies the relation: CT2=0.190 (mm).

In the sixth embodiment of the present photographing lens system, the on-axis thickness of the second lens element 1120 is CT2, the focal length of the photographing lens system is f, and they satisfy the relation: (CT2/f)*100=5.3.

In the sixth embodiment of the present photographing lens system, the radius of curvature of the object-side surface 1111 of the first lens element 1110 is R1, the focal length of the photographing lens system is f, and they satisfy the relation: (R1/f)*100=28.1.

In the sixth embodiment of the present photographing lens system, the on-axis spacing between the second lens element 1120 and the third lens element 1130 is T23, the focal length of the photographing lens system is f, and they satisfy the relation: (T23/f)*100=14.7.

In the sixth embodiment of the present photographing lens system, the radius of curvature of the object-side surface 1131 of the third lens element 1130 is R5, the radius of curvature of the image-side surface 1132 of the third lens element 1130 is R6, and they satisfy the relation: R5/R6=1.90.

In the sixth embodiment of the present photographing lens system, the focal length of the photographing lens system is f, the focal length of the first lens element 1110 is f1, and they satisfy the relation: f/f1=1.41.

In the sixth embodiment of the present photographing lens system, the focal length of the photographing lens system is f, the focal length of the second lens element 1120 is f2, and they satisfy the relation: f/f2=−0.45.

In the sixth embodiment of the present photographing lens system, the focal length of the photographing lens system is f, the focal length of the third lens element 1130 is f3, and they satisfy the relation: |f/f3|=0.13.

In the sixth embodiment of the present photographing lens system, the image plane 1150 is provided with an electronic sensor on which an object is imaged. The on-axis spacing between the object-side surface 1111 of the first lens element 1110 and the electronic sensor is TTL, half of the diagonal length of the effective pixel area of the electronic sensor is ImgH, and they satisfy the relation: TTL/ImgH=1.71.

The detailed optical data of the sixth embodiment is shown in FIG. 27 (TABLE 11), and the aspheric surface data is shown in FIGS. 28A and 28B (TABLES 12A and 12B), wherein the units of the radius of curvature, the thickness and the focal length are expressed in mm, and HFOV is half of the maximal field of view.

Figure 13:
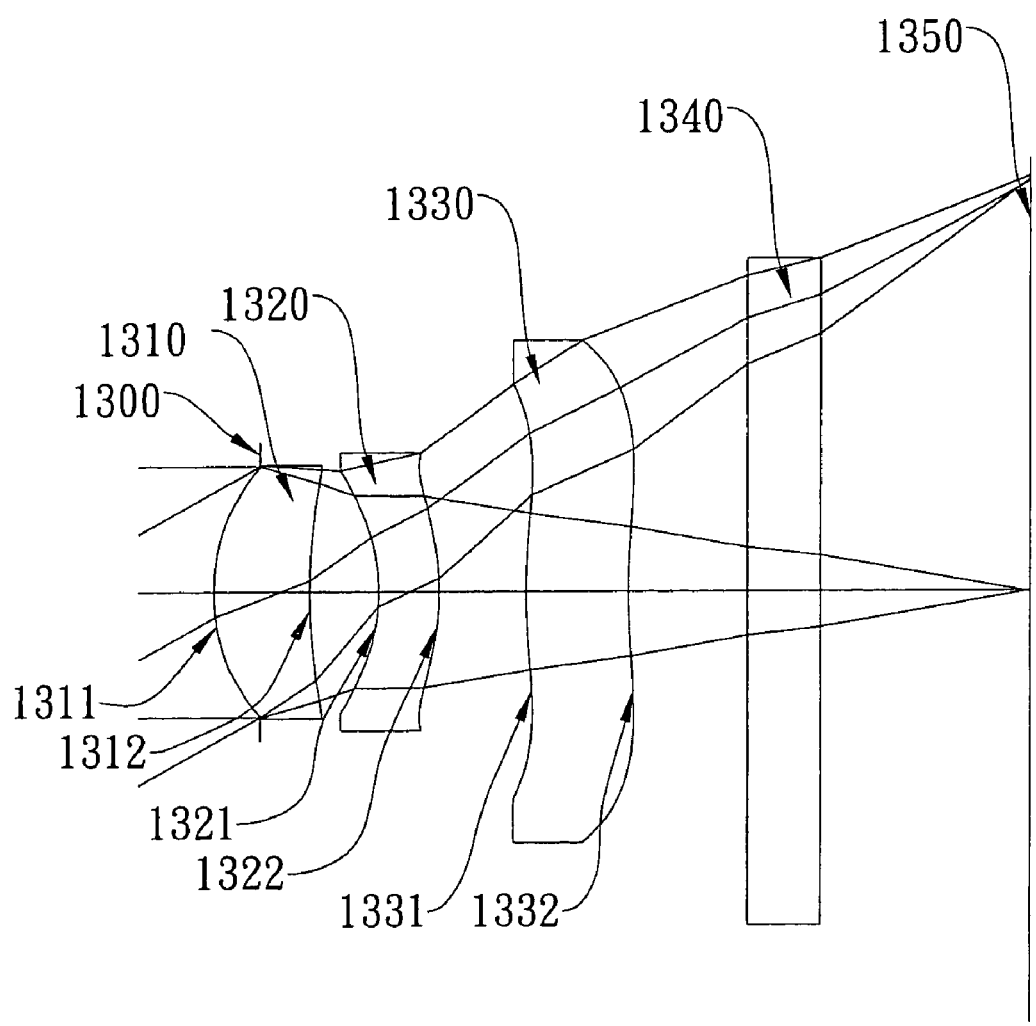
FIG. 13 shows a photographing lens system in accordance with a seventh embodiment of the present invention.
Figure 14:
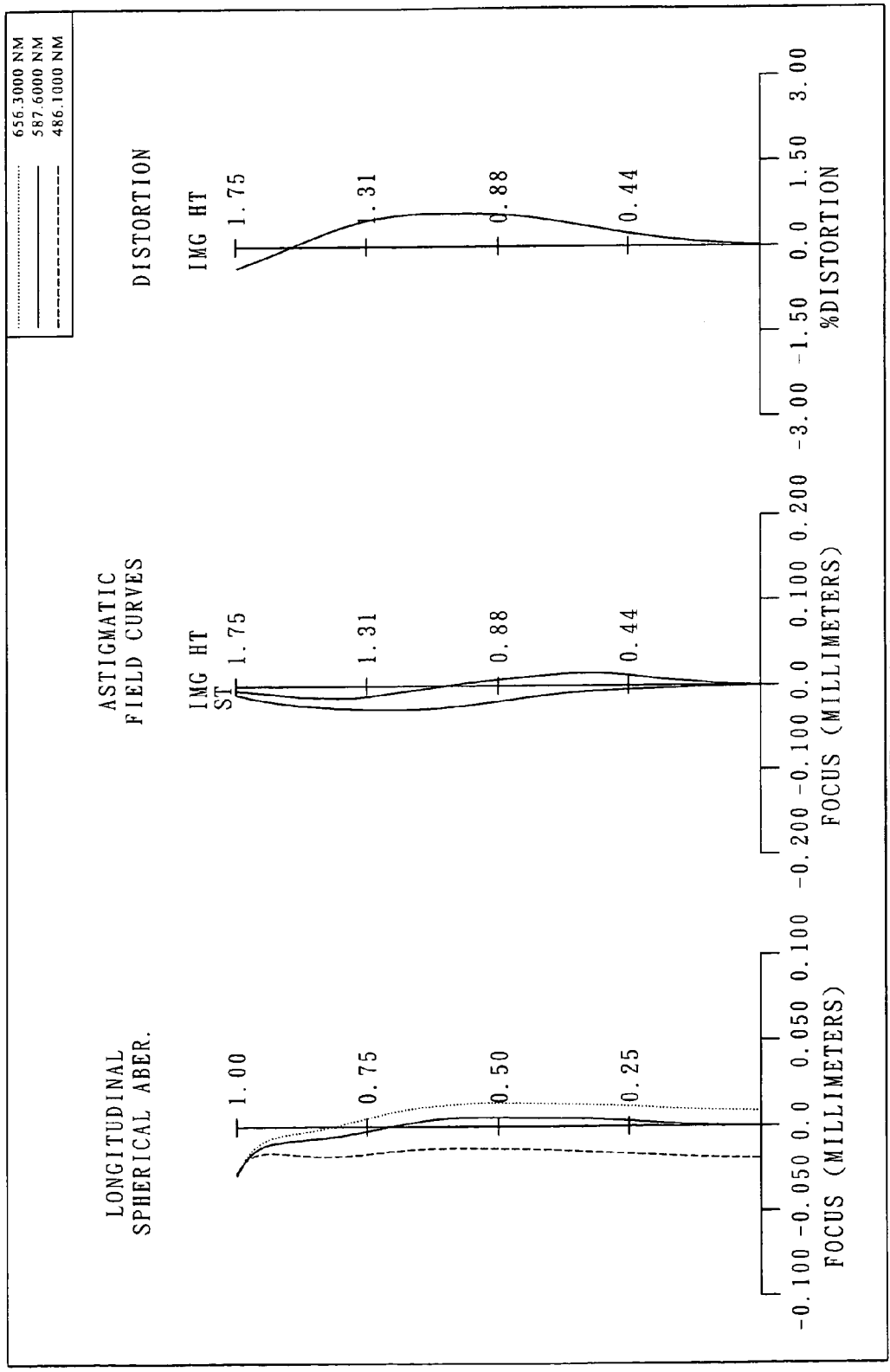
FIG. 14 shows the aberration curves of the seventh embodiment of the present invention.

FIG. 13 shows a photographing lens system in accordance with a seventh embodiment of the present invention, and FIG. 14 shows the aberration curves of the seventh embodiment of the present invention. The photographing lens system of the seventh embodiment of the present invention mainly comprises three lens elements, in order from the object side to the image side: a plastic first lens element 1310 with positive refractive power having a convex object-side surface 1311 and a concave image-side surface 1312, the object-side and image-side surfaces 1311 and 1312 thereof being aspheric; a plastic second lens element 1320 with negative refractive power having a concave object-side surface 1321 and a convex image-side surface 1322, the object-side and image-side surfaces 1321 and 1322 thereof being aspheric; and a plastic third lens element 1330 with positive refractive power having a convex object-side surface 1331 and a concave image-side surface 1332, the object-side and image-side surfaces 1331 and 1332 thereof being aspheric and each of which being provided with at least one inflection point; wherein an aperture stop 1300 is disposed between an imaged object and the first lens element 1310; wherein an IR filter 1340 is disposed between the image-side surface 1332 of the third lens element 1330 and an image plane 1350; and wherein the IR filter 1340 is made of glass and has no influence on the focal length of the photographing lens system.

The equation of the aspheric surface profiles of the seventh embodiment has the same form as that of the first embodiment.

In the seventh embodiment of the present photographing lens system, the focal length of the photographing lens system is f, and it satisfies the relation: f=3.05 (mm).

In the seventh embodiment of the present photographing lens system, the f-number of the photographing lens system is Fno, and it satisfies the relation: Fno=2.85.

In the seventh embodiment of the present photographing lens system, half of the maximal field of view of the photographing lens system is HFOV, and it satisfies the relation: HFOV=30.0 deg.

In the seventh embodiment of the present photographing lens system, the Abbe number of the first lens element 1310 is V1, the Abbe number of the second lens element 1320 is V2, and they satisfy the relation: V1−V2=32.5.

In the seventh embodiment of the present photographing lens system, the on-axis thickness of the second lens element 1320 is CT2', and it satisfies the relation: CT2=0.250 (mm).

In the seventh embodiment of the present photographing lens system, the on-axis thickness of the second lens element 1320 is CT2, the focal length of the photographing lens system is f, and they satisfy the relation: (CT2/f)*100=8.2.

In the seventh embodiment of the present photographing lens system, the radius of curvature of the object-side surface 1311 of the first lens element 1310 is R1, the focal length of the photographing lens system is f, and they satisfy the relation: (R1/f)*100=28.4.

In the seventh embodiment of the present photographing lens system, the on-axis spacing between the second lens element 1320 and the third lens element 1330 is T23, the focal length of the photographing lens system is f, and they satisfy the relation: (T23/f)*100=11.8.

In the seventh embodiment of the present photographing lens system, the radius of curvature of the object-side surface 1331 of the third lens element 1330 is R5, the radius of curvature of the image-side surface 1332 of the third lens element 1330 is R6, and they satisfy the relation: R5/R6=0.70.

In the seventh embodiment of the present photographing lens system, the focal length of the photographing lens system is f, the focal length of the first lens element 1310 is f1, and they satisfy the relation: f/f1=1.34.

In the seventh embodiment of the present photographing lens system, the focal length of the photographing lens system is f, the focal length of the second lens element 1320 is f2, and they satisfy the relation: f/f2=−0.64.

In the seventh embodiment of the present photographing lens system, the focal length of the photographing lens system is f, the focal length of the third lens element 1330 is f3, and they satisfy the relation: |f/f3|=0.27.

In the seventh embodiment of the present photographing lens system, the image plane 1350 is provided with an electronic sensor on which an object is imaged. The on-axis spacing between the object-side surface 1311 of the first lens element 1310 and the electronic sensor is TTL, half of the diagonal length of the effective pixel area of the electronic sensor is ImgH, and they satisfy the relation: TTL/ImgH=1.88.

The detailed optical data of the seventh embodiment is shown in FIG. 29 (TABLE 13), and the aspheric surface data is shown in FIGS. 30A and 30B (TABLES 14A and 14B), wherein the units of the radius of curvature, the thickness and the focal length are expressed in mm, and HFOV is half of the maximal field of view.

Figure 15:
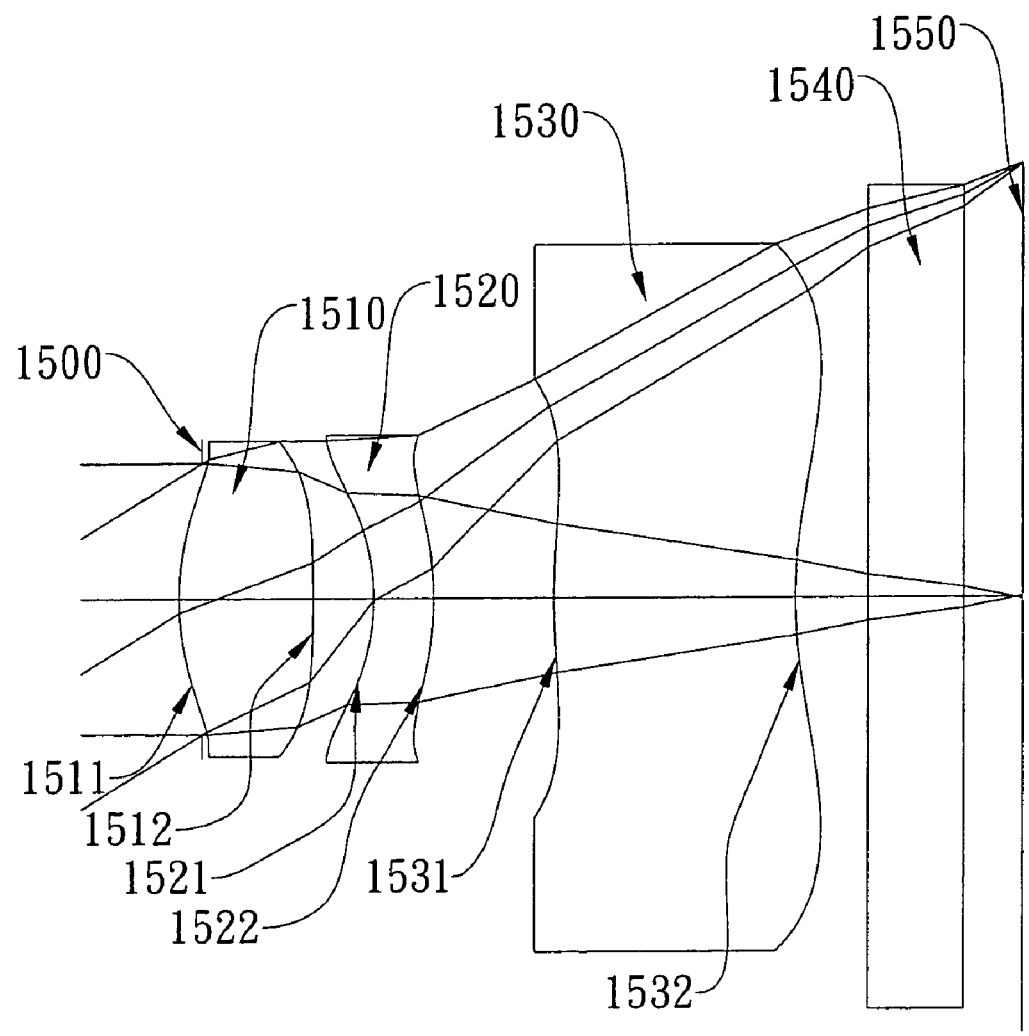
FIG. 15 shows a photographing lens system in accordance with an eighth embodiment of the present invention.
Figure 16:
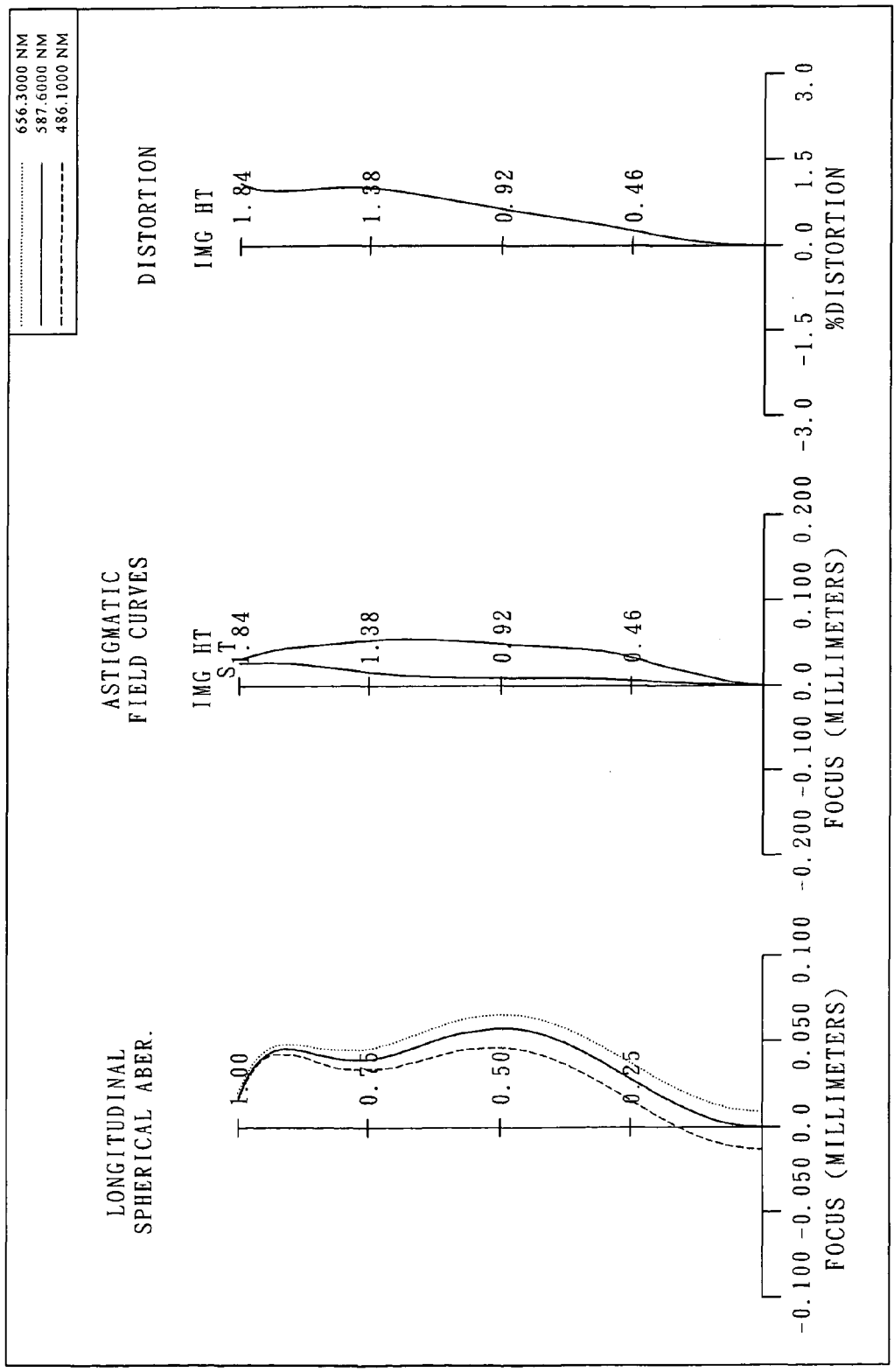
FIG. 16 shows the aberration curves of the eighth embodiment of the present invention.

FIG. 15 shows a photographing lens system in accordance with an eighth embodiment of the present invention, and FIG. 16 shows the aberration curves of the eighth embodiment of the present invention. The photographing lens system of the eighth embodiment of the present invention mainly comprises three lens elements, in order from the object side to the image side: a plastic first lens element 1510 with positive refractive power having a convex object-side surface 1511 and a convex image-side surface 1512, the object-side and image-side surfaces 1511 and 1512 thereof being aspheric; a plastic second lens element 1520 with negative refractive power having a concave object-side surface 1521 and a convex image-side surface 1522, the object-side and image-side surfaces 1521 and 1522 thereof being aspheric; and a plastic third lens element 1530 with negative refractive power having a convex object-side surface 1531 and a concave image-side surface 1532, the object-side and image-side surfaces 1531 and 1532 thereof being aspheric and each of which being provided with at least one inflection point; wherein an aperture stop 1500 is disposed between an imaged object and the first lens element 1510; wherein an IR filter 1540 is disposed between the image-side surface 1532 of the third lens element 1530 and an image plane 1550; and wherein the IR filter 1540 is made of glass and has no influence on the focal length of the photographing lens system.

The equation of the aspheric surface profiles of the eighth embodiment has the same form as that of the first embodiment.

In the eighth embodiment of the present photographing lens system, the focal length of the photographing lens system is f, and it satisfies the relation: f=2.90 (mm).

In the eighth embodiment of the present photographing lens system, the f-number of the photographing lens system is Fno, and it satisfies the relation: Fno=2.45.

In the eighth embodiment of the present photographing lens system, half of the maximal field of view of the photographing lens system is HFOV, and it satisfies the relation: HFOV=32.4 deg.

In the eighth embodiment of the present photographing lens system, the Abbe number of the first lens element 1510 is V1, the Abbe number of the second lens element 1520 is V2, and they satisfy the relation: V1−V2=32.5.

In the eighth embodiment of the present photographing lens system, the on-axis thickness of the second lens element 1520 is CT2, and it satisfies the relation: CT2=0.250 (mm).

In the eighth embodiment of the present photographing lens system, the on-axis thickness of the second lens element 1520 is CT2, the focal length of the photographing lens system is f, and they satisfy the relation: (CT2/f)*100=8.6.

In the eighth embodiment of the present photographing lens system, the radius of curvature of the object-side surface 1511 of the first lens element 1510 is R1, the focal length of the photographing lens system is f, and they satisfy the relation: (R1/f)*100=43.5.

In the eighth embodiment of the present photographing lens system, the on-axis spacing between the second lens element 1520 and the third lens element 1530 is T23, the focal length of the photographing lens system is f, and they satisfy the relation: (T23/f)*100=17.1.

In the eighth embodiment of the present photographing lens system, the radius of curvature of the object-side surface 1531 of the third lens element 1530 is R5, the radius of curvature of the image-side surface 1532 of the third lens element 1530 is R6, and they satisfy the relation: R5/R6=1.50.

In the eighth embodiment of the present photographing lens system, the focal length of the photographing lens system is f, the focal length of the first lens element 1510 is f1, and they satisfy the relation: f/f1=1.46.

In the eighth embodiment of the present photographing lens system, the focal length of the photographing lens system is f, the focal length of the second lens element 1520 is f2, and they satisfy the relation: f/f2=−0.60.

In the eighth embodiment of the present photographing lens system, the focal length of the photographing lens system is f, the focal length of the third lens element 1530 is f3, and they satisfy the relation: |f/f3|=0.17.

In the eighth embodiment of the present photographing lens system, the image plane 1550 is provided with an electronic sensor on which an object is imaged. The on-axis spacing between the object-side surface 1511 of the first lens element 1510 and the electronic sensor is TTL, half of the diagonal length of the effective pixel area of the electronic sensor is ImgH, and they satisfy the relation: TTL/ImgH=1.82.

The detailed optical data of the eighth embodiment is shown in FIG. 31 (TABLE 15), and the aspheric surface data is shown in FIG. 32 (TABLE 16), wherein the units of the radius of curvature, the thickness and the focal length are expressed in mm, and HFOV is half of the maximal field of view.

It is to be noted that TABLES 1-16 (illustrated in FIGS. 17-32 respectively) show different data of the different embodiments, however, the data of the different embodiments are obtained from experiments. Therefore, any photographing lens system of the same structure is considered to be within the scope of the present invention even if it uses different data. The embodiments depicted above and the appended drawings are exemplary and are not intended to limit the claim scope of the present invention. TABLE 17 (illustrated in FIG. 33) shows the data of the respective embodiments resulting from the equations.

What is claimed is:

1. A photographing lens system comprising, in order from an object side to an image side:
   a first lens element with positive refractive power having a convex object-side surface;
   a second lens element with negative refractive power, the object-side and image-side surfaces thereof being aspheric;
   a third lens element having a concave image-side surface, the object-side and image-side surfaces thereof being aspheric and at least one of which being provided with at least one inflection point; and
   an aperture stop disposed between an imaged object and the first lens element; wherein there are three lens elements with refractive power; and wherein a focal length of the photographing lens system is f, a focal length of the first lens element is f1, a focal length of the second lens element is f2, a radius of curvature of the object-side surface of the first lens element is R1, an Abbe number of the first lens element is V1, an Abbe number of the second lens element is V2, and they satisfy the relations: 1.28<f/f1<2.0, 23.0<(R1/f)*100<33.0, 30.5<V1−V2<46.0, −0.65<f/f2<−0.25.

2. The photographing lens system according to claim 1, wherein the second lens element has a concave object-side surface and a convex image-side surface; and wherein the second and third lens elements are made of plastic material.

3. The photographing lens system according to claim 2, wherein the first lens element has a concave image-side surface.

4. The photographing lens system according to claim 3, wherein the first lens element is made of plastic material and at least one of the object-side and image-side surfaces thereof is aspheric.

5. The photographing lens system according to claim 3, wherein the radius of curvature of the object-side surface of the first lens element is R1, the focal length of the photographing lens system is f, and they satisfy the relation: $23.0 < (R1/f)*100 < 29.0$.

6. The photographing lens system according to claim 5, wherein an on-axis thickness of the second lens element is CT2, the focal length of the photographing lens system is f, and they satisfy the relations: $2.0 < (CT2/f)*100 < 12.0$, $0.10 \text{ [mm]} < CT2 < 0.38 \text{ [mm]}$.

7. The photographing lens system according to claim 5, wherein the focal length of the photographing lens system is f, the focal length of the first lens element is f1, and they satisfy the relation: $1.33 < f/f1 < 1.70$.

8. The photographing lens system according to claim 5, wherein the third lens element has negative refractive power and a convex object-side surface; and wherein the focal length of the photographing lens system is f, a focal length of the third lens element is f3, and they satisfy the relation: $0 < |f/f3| < 0.25$.

9. The photographing lens system according to claim 8, wherein an on-axis spacing between the second and third lens elements is T23, the focal length of the photographing lens system is f, a radius of curvature of the object-side surface of the third lens element is R5, a radius of curvature of the image-side surface of the third lens element is R6, and they satisfy the relations: $13.0 < (T23/f)*100 < 20.0$, $0.5 < R5/R6 < 2.0$.

10. The photographing lens system according to claim 3 further comprising an electronic sensor on which an object is imaged, wherein an on-axis spacing between the object-side surface of the first lens element and the electronic sensor is TTL, half of the diagonal length of the effective pixel area of the electronic sensor is ImgH, and they satisfy the relation: $TTL/ImgH < 1.85$.

11. A photographing lens system comprising, in order from an object side to an image side:
   a first lens element with positive refractive power having a convex object-side surface;
   a second lens element with negative refractive power having a concave object-side surface and a convex image-side surface, the object-side and image-side surfaces thereof being aspheric;
   a third lens element having a concave image-side surface, the object-side and image-side surfaces thereof being aspheric and at least one of which being provided with at least one inflection point; and
   an aperture stop disposed between an imaged object and the second lens element; wherein there are three lens elements with refractive power; and wherein a radius of curvature of the object-side surface of the first lens element is R1, a focal length of the photographing lens system is f, an Abbe number of the first lens element is V1, an Abbe number of the second lens element is V2, an on-axis thickness of the second lens element is CT2, an on-axis spacing between the second and third lens elements is T23, and they satisfy the relations: $23.0 < (R1/f)*100 < 33.0$, $30.5 < V1-V2 < 46.0$, $2.0 < (CT2/f)*100 < 9.0$, $0.10 \text{ [mm]} < CT2 < 0.38 \text{ [mm]}$, $10.0 < (T23/f)*100 < 22.0$.

12. The photographing lens system according to claim 11, wherein the first lens element has a concave image-side surface and at least one of the object-side and image-side surfaces thereof is aspheric.

13. The photographing lens system according to claim 12, wherein the focal length of the photographing lens system is f, a focal length of the first lens element is f1, and they satisfy the relation: $1.28 < f/f1 < 2.0$.

14. The photographing lens system according to claim 13, wherein the third lens element has negative refractive power and a convex object-side surface.

15. The photographing lens system according to claim 14, wherein the on-axis thickness of the second lens element is CT2, and it satisfies the relation: $0.10 \text{ [mm]} < CT2 < 0.29 \text{ [mm]}$.

16. The photographing lens system according to claim 15, wherein the aperture stop is disposed between the imaged object and the first lens element.

17. The photographing lens system according to claim 16, wherein the focal length of the photographing lens system is f, the focal length of the first lens element is f1, and they satisfy the relation: $1.33 < f/f1 < 1.70$.

18. The photographing lens system according to claim 16, wherein the focal length of the photographing lens system is f, a focal length of the third lens element is f3, the on-axis spacing between the second and third lens elements is T23, and they satisfy the relations: $0 < |f/f3| < 0.25$, $13.0 < (T23/f)*100 < 20.0$.

19. The photographing lens system according to claim 18, wherein the focal length of the photographing lens system is f, a focal length of the second lens element is f2, a radius of curvature of the object-side surface of the third lens element is R5, a radius of curvature of the image-side surface of the third lens element is R6, and they satisfy the relations: $-0.65 < f/f2 < -0.25$, $0.5 < R5/R6 < 2.0$.

20. The photographing lens system according to claim 11 further comprising an electronic sensor on which an object is imaged, wherein an on-axis spacing between the object-side surface of the first lens element and the electronic sensor is TTL, half of the diagonal length of the effective pixel area of the electronic sensor is ImgH, and they satisfy the relation: $TTL/ImgH < 1.85$.

* * * * *

UNITED STATES PATENT AND TRADEMARK OFFICE
CERTIFICATE OF CORRECTION

PATENT NO. : 8,355,213 B2  Page 1 of 1
APPLICATION NO. : 12/659501
DATED : January 15, 2013
INVENTOR(S) : Hsiang Chi Tang et al.

It is certified that error appears in the above-identified patent and that said Letters Patent is hereby corrected as shown below:

On the Title Page

The Assignee's name is incorrectly spelled/listed as:

(73) Assignee: Largen Precision Co., Ltd.

The correct spelling of the name of the Assignee is:

(73) Assignee: ~~Largen~~Larg<u>a</u>n Precision Co., Ltd.

Signed and Sealed this
Twenty-fifth Day of June, 2013

Teresa Stanek Rea
*Acting Director of the United States Patent and Trademark Office*